United States Patent
Banning et al.

(10) Patent No.: US 6,223,805 B1
(45) Date of Patent: May 1, 2001

(54) METHOD FOR MANUFACTURING CASTABLE METAL MATRIX COMPOSITE BODIES AND BODIES PRODUCED THEREBY

(75) Inventors: Charles Robert Banning, Newark; John Thomas Burke, Hockessin; Alan Scott Nagelberg, Wilmington; Vilupanur Alwar Ravi, Bear; Michael Allan Richmond; Chwen Chih Yang, both of Newark, all of DE (US)

(73) Assignee: Lanxide Technology Company, LP, Newark, DE (US)

( * ) Notice: Subject to any disclaimer, the term of this patent is extended or adjusted under 35 U.S.C. 154(b) by 0 days.

(21) Appl. No.: 08/231,574

(22) Filed: Apr. 22, 1994

(51) Int. Cl.[7] .............................. B22D 19/14; B22D 19/00
(52) U.S. Cl. ................................................. 164/97; 164/98
(58) Field of Search ......................................... 164/97, 98

(56) References Cited

U.S. PATENT DOCUMENTS

| | | | | |
|---|---|---|---|---|
| 4,759,995 | * | 7/1988 | Skibo et al. | 428/614 |
| 5,222,542 | * | 6/1993 | Burke | 164/97 |
| 5,299,724 | * | 4/1994 | Bruski et al. | 164/97 |
| 5,372,777 | * | 12/1994 | Yang | 164/91 |

* cited by examiner

Primary Examiner—Jack W. Lavinder
Assistant Examiner—I.-H. Lin
(74) Attorney, Agent, or Firm—Jeffrey R. Ramberg

(57) ABSTRACT

The present invention relates to a novel method for forming cast metal matrix composite bodies. In particular, the present invention relates to a novel method for forming or recycling metal matrix composite bodies so as to render such bodies in a condition for casting or recasting as a cast metal matrix composite body. Specifically, a scrap metal matrix composite body and preferably a scrap cast metal matrix composite body is placed into a crucible, optionally along with unreinforced matrix metal and/or virgin metal matrix composite material. Whether the scrap and/or virgin materials are placed into the crucible in solid or molten form, the contents of the crucible are ultimately rendered molten to form a composite melt. A means for applying high shearing rates to the composite melt, such as an impeller rotating at high speed is immersed into the composite melt and the composite melt is sheared for a time sufficient to comminute any entrained inclusions such as entrapped oxide skins to a size at which such comminuted inclusions are substantially ameliorated in terms of their effect on the fluidity of the composite melt and the mechanical properties of the subsequent cast metal matrix composite bodies. Upon conclusion of the high intensity shearing process, the high power shearing apparatus is removed from the composite melt and the composite melt is cast using appropriate techniques for casting metal matrix composite material.

20 Claims, 7 Drawing Sheets

METHOD FOR MANUFACTURING CASTABLE METAL MATRIX COMPOSITE BODIES AND BODIES PRODUCED THEREBY

FIELD OF THE INVENTION

The present invention relates to a novel method for forming cast metal matrix composite bodies. In particular, the present invention relates to a novel method for forming or recycling metal matrix composite bodies so as to render such bodies in a condition for casting or recasting as a cast metal matrix composite body. Specifically, a scrap metal matrix composite body and preferably a scrap cast metal matrix composite body is placed into a crucible, optionally along with unreinforced matrix metal and/or virgin metal matrix composite material. Whether the scrap and/or virgin materials are placed into the crucible in solid or molten form, the contents of the crucible are ultimately rendered molten to form a composite melt. A means for applying high shearing rates to the composite melt, such as an impeller rotating at high speed is immersed into the composite melt and the composite melt is sheared for a time sufficient to comminute any entrained inclusions such as entrapped oxide skins to a size at which such comminuted inclusions are substantially ameliorated in terms of their effect on the fluidity of the composite melt and the mechanical properties of the subsequent cast metal matrix composite bodies. Upon conclusion of the high intensity shearing process, the high power shearing apparatus is removed from the composite melt and the composite melt is cast using appropriate techniques for casting metal matrix composite material.

BACKGROUND OF THE INVENTION

As in conventional casting of unreinforced metals, it is typically important to cleanse the alloy of inclusions such as dross, which can become entrained through stirring an unprotected melt too vigorously or thru recycling of solidified alloy.

In conventional casting/melting of Al alloys, the usual procedure for removing these solid impurities from the melt has been to inject a gas into the melt and distribute the gas throughout the melt, preferably in the form of small, discrete bubbles (usually by means of an impeller). The gas attaches to and thereby assists the dross inclusions in rising to the surface where they can be removed, typically by skimming.

For many years, the purifying gas of choice was one of the chlorinaceous gases, and most particularly, chlorine. It was thought that these gases were particularly good at removing the non-metallic inclusions present in the melt. Chlorine, of course, is a highly corrosive and toxic gas, as are many of its compounds. Because not all of the chlorine was consumed in the melt, substantial amounts of residual chlorine gas were liberated by this particular processing treatment, thus giving rise to not insignificant containment and disposal problems because of the health, safety and environmental hazards of chlorine gas. Even if all of the chlorine were to react, many of the reaction products, such as the tetrachlorides of titanium and silicon, for example, are also gases under the process conditions and are nearly as hazardous as chlorine gas itself.

Accordingly, halide salts such as NaCl and KCl have been substituted for the gaseous halogens for the fluxing and degassing operation. The salts are stirred into the melt in molten form and collect at the surface after the cation exchange reaction takes place. This substitution only partly alleviated the chlorinaceous gas problem because $TiCl_4$ and $SiCl_4$ gases could still be formed using this approach. Also, the molten salt fluxing technique tends to add sodium and potassium to the melt, which are generally undesirable impurities.

Another response to the attendant problems of fluxing and degassing with chlorinaceous gases was to switch to the use of at least relatively inert gases such as argon and/or nitrogen. While this change substantially addressed the health, safety and environmental problems caused by the halogens, some foundrymen complained that these "inert" gases did not work as effectively as, for example, chlorine in removing non-metallic impurities and hydrogen. This complaint was at least partially addressed through the development of improved means (typically improved impeller designs) for dispersing the inert gases into the melt in the form of very fine bubbles and giving all of the melt adequate opportunity to contact the dispersed gas.

One of the subsidiary issues which arose with the development of metal matrix composites, particularly cast reinforced aluminum composites, was, again, concerned with fluxing and degassing of the composite melt. It appears to be the case that the ceramic reinforcements which are employed in many aluminum matrix composite systems are rather easily and readily "de-wetted" by contact with any of the above-described fluxing/degassing agents, including, most unfortunately, the inert gases.

In its most "benign" form, such de-wetting merely reduces the degree of bonding between the reinforcement particle and the aluminum matrix. Still, such a reduction often has a deleterious effect on the properties, particularly the mechanical properties of the cast composite because such composites, unlike, for example, a typical ceramic matrix composite, typically benefit from strong bonding between the reinforcement and the matrix.

A more serious consequence of the reinforcement de-wetting phenomenon resulting from an unmodified application of the fluxing/degassing procedures developed for unreinforced alloys to their composite counterparts is the wholesale loss of the ceramic reinforcement from the melt. It appears to be the case, at least in several reinforced aluminum casting systems, that the ceramic reinforcement prefers to contact the gases which are injected into the melt rather than the aluminum matrix metal. The result of this preference is that ceramic particulates, for example, can become "captured" by gas or salt bubbles and be floated right out of the melt. Clearly, the fluxing and degassing procedures developed for unreinforced alloys could not be applied directly to composite melts. On the other hand, Provencher et al. have harnessed this phenomenon as a means for reclaiming a metal matrix composite material. Specifically, U.S. Pat. No. 5,080,715 teaches injection of a molten salt and a gas into a composite melt and mixing to form salt coated gas bubbles. Upon contact of the wetted reinforcing particles with the salt coated bubbles, the reinforcing particles are de-wetted and caused to rise to the surface along with the salt flux, leaving behind substantially pure metal.

U.S. Pat. No. 4,992,241 to Provencher et al. provides one approach to the problem of fluxing and degassing composite melts without removing the reinforcement particles. The solution provided by Provencher et al. represents a modification of standard fluxing/degassing. Specifically, while maintaining the composite melt at a temperature between 720 and 750° C. and stirring without creating a vortex, a mixture of an inert gas and a reactive gas is injected into the melt near the impeller. The injection and stirring are carefully controlled to disperse the injected gas throughout the melt in the form of fine bubbles. When the dispersion has been achieved (typically after about 10 minutes), the injection is ceased. The composite melt is allowed to rest, still at a temperature of 720–750° C. During this time, hydrogen gas diffuses into the bubbles, which also attach themselves to non-metallic impurities as the bubbles float to the surface to form a dross layer. Also during the rest period, the composite melt is stirred periodically (typically for 5 minutes at 10 minute intervals) to keep the ceramic reinforcement suspended in the melt. The dross layer, containing oxide films and other impurities, may then be skimmed off of the surface of the composite melt in the usual fashion.

The commercial acceptance of metal matrix composite materials, particularly cast metal matrix composites will be enhanced by the existence of procedures for recycling such material. Even if one were to ignore all of the costs associated with disposing of a material once an article fabricated from that material has exhausted its useful life, a strong incentive to recycle castable materials still exists because, even when a perfect casting is made, a considerable amount of ancillary cast material remains, most notably in the form of casting gates and runners.

The use of recycled cast metal matrix composites can introduce potentially deleterious oxide inclusions, most especially oxide "skins" which can become trapped in the remelt. Unless proactive measures are taken to address this issue, casting problems are likely to result. For example, the presence of such oxide skins in the casting may drastically impair the mechanical strength and toughness of the casting. Moreover, attempts to prevent such oxide skins from getting into the casting as by, for example, filtering, run the risk of clogging the filter with oxide skin, thereby impairing further transport of composite material into the casting. Instead, the oxide skins, or "dross inclusions" in general must either be removed or otherwise rendered as harmless as possible before the composite material is recast.

DESCRIPTION OF COMMONLY OWNED PATENTS AND PATENT APPLICATIONS

A novel method of making a metal matrix composite material is disclosed in Commonly Owned and Copending U.S. patent application Ser. No. 08/078,146, filed Jun. 16, 1993, as a continuation of U.S. patent application Ser. No. 07/933,609, filed Aug. 21, 1992 (now abandoned), which is a continuation of U.S. patent application Ser. No. 07/725,400, filed on Jul. 1, 1991, now abandoned, as a continuation of U.S. patent application Ser. No. 07/504,074, filed on Apr. 3, 1990, now abandoned, as a continuation of U.S. patent application Ser. No. 07/269,251, filed on Nov. 9, 1988, now abandoned, as a continuation of Commonly Owned U.S. Pat. No. 4,828,008, which issued on May 9, 1989, in the names of White et al., and entitled "Metal Matrix Composites". According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned and Copending U.S. patent application Ser. No. 07/934,823, filed on Aug. 24, 1992, as a continuation of Commonly Owned U.S. Pat. No. 5,141,819, entitled "Method of Making Metal Matrix Composite with the Use of a Barrier", which issued Aug. 25, 1992, in the names of Michael K. Aghajanian et al. from U.S. patent application Ser. No. 07/415,088, filed on Sep. 29, 1989, now abandoned, which was a continuation of Commonly Owned U.S. Pat. No. 4,935,055, which issued on Jun. 19, 1990, in the names of Michael K. Aghajanian et al., and entitled "Method of Making Metal Matrix Composite with the Use of a Barrier". According to the method of this Aghajanian et al. invention, a barrier means (e.g., particulate titanium diboride or a graphite material such as a flexible graphite tape product sold by Union Carbide under the trade name GRAFOIL®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008, was improved upon by Commonly Owned and Copending U.S. patent application Ser. No. 07/994,064, filed on Dec. 18, 1992, which is a continuation of U.S. patent application Ser. No. 07/759,745, filed on Sep. 12, 1991, now abandoned, as a continuation of U.S. patent application Ser. No. 07/517,541, filed on Apr. 24, 1990, now abandoned, which was a continuation of U.S. patent application Ser. No. 07/168,284, filed Mar. 15, 1988, now abandoned, all in the names of Michael K. Aghajanian and Marc S. Newkirk and entitled "Metal Matrix Composites and Techniques for Making the Same." In accordance with the methods disclosed in this copending U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described herein and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned U.S. Pat. No. 5,249,621, which issued Oct. 5, 1993, in the names of Aghajanian et al. and entitled "Method of Forming Metal Matrix Composite Bodies by a Spontaneous Infiltration Process and Products Produced Therefrom" from U.S. patent application Ser. No. 07/863,894, filed Apr. 6, 1992, which is a continuation application of U.S. patent application Ser. No. 07/521,043, filed May 9, 1990, now abandoned, which is a continuation-in-part of U.S. patent application Ser. No. 07/484,753, filed Feb. 23, 1990, now abandoned, which was a continuation-in-part of U.S. patent application Ser. No. 07/432,661, filed Nov. 7, 1989, now abandoned, which was a continuation-in-part of U.S. patent application Ser. No. 07/416,327, filed Oct. 6, 1989, now abandoned, which was a continuation-in-part of U.S. patent application Ser. No. 07/349,590, filed May 9, 1989 (now abandoned), which was a continuation-in-part of U.S. patent application Ser. No. 07/269,311, filed Nov. 10, 1988, now abandoned, in the names of Michael K. Aghajanian et al. and entitled "A Method of Forming Metal Matrix Composite Bodies by a Spontaneous Infiltration Process, and Products Produced Therefrom". According to this Aghajanian et al. invention, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. Aghajanian et al. disclose a number of matrix metal/infiltration enhancer precursor/infiltrating atmosphere systems which exhibit spontaneous infiltration. Specifically, Aghajanian, et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian, et al. applications that the spontaneous infiltration behavior should occur in other matrix metal/infiltration enhancer precursor/infiltrating atmosphere systems.

Another related Commonly Owned and Copending U.S. patent application Ser. No. 08/083,823, filed on Jun. 28, 1993, which is a continuation of Commonly Owned U.S. Pat. No. 5,222,542, which issued Jun. 29, 1993, which is a continuation-in-part of U.S. patent application Ser. No. 07/269,308, filed Nov. 10, 1988, which issued to U.S. Pat. No. 5,000,247 on Mar. 19, 1991, and naming as sole inventor John Thomas Burke and entitled "Method For Forming Metal Matrix Composite Bodies With A Dispersion Casting Technique and Products Produced Thereby". These patent applications and patents relate to a novel method for forming metal matrix composite bodies. A permeable mass of filler material is spontaneously infiltrated by a quantity of molten matrix metal in excess of that amount needed to completely infiltrate the permeable mass. Particularly, an infiltration enhancer and/or an infiltration enhancer precursor and/or an infiltrating atmosphere are in communication with the filler material, at least at some point during the process, which permits molten matrix metal to spontaneously infiltrate the filler material. After infiltration has been completed to a desired extent, the melt is stirred so as to substantially uniformly disperse the particles of filler material throughout the entire quantity of matrix metal. The matrix metal then can be permitted to cool in situ or the dispersion of matrix metal and filler material can be poured into a second container as a casting process to form a desired shape which corresponds to the second container. However, the formed suspension, whether cast immediately after being formed or after cooling and thereafter heating and casting, can be pour cast into a desired shape while retaining beneficial characteristics associated with spontaneously infiltrated metal matrix composites.

A method of forming macrocomposite bodies by a somewhat related process is disclosed in Commonly Owned and Copending U.S. patent application Ser. No. 07/966,124, filed on Oct. 23, 1992, as a continuation of U.S. patent application Ser. No. 07/747,213, filed on Aug. 19, 1991 (now abandoned), as a continuation of U.S. patent application Ser. No. 07/269,464, which was filed on Nov. 10, 1988, and issued as U.S. Pat. No. 5,040,588 on Aug. 20, 1991, in the names of Marc S. Newkirk et al., and entitled "Methods for Forming Macrocomposite Bodies and Macrocomposite Bodies Produced Thereby". A continuation of U.S. Pat. No. 5,040,588, was filed on Aug. 19, 1991, as U.S. patent application Ser. No. 07/747,213, now abandoned. These applications and Patent disclose various methods relating to the formation of macrocomposite bodies by spontaneously infiltrating a permeable mass of filler material or a preform with molten matrix metal and bonding the spontaneously infiltrated material to at least one second material such as a ceramic and/or a metal. Particularly, an infiltration enhancer and/or infiltration enhancer precursor and/or infiltrating atmosphere are in communication with a filler material or a preform, at least at some point during the process, which permits molten matrix metal to spontaneously infiltrate the filler material or preform. Moreover, prior to infiltration, the filler material or preform is placed into contact with at least a portion of a second material such that after infiltration of the filler material or preform, the infiltrated material is bonded to the second material, thereby forming a macrocomposite body.

A method of forming metal matrix composite bodies by a self-generated vacuum process is disclosed in Commonly Owned and Copending U.S. patent application Ser. No. 08/085,575, filed on Jul. 1, 1993, as a continuation of Commonly Owned U.S. Pat. No. 5,224,533, which issued on Jul. 6, 1993, which was filed on May 22, 1992, as U.S. patent application Ser. No. 07/888,241, as a continuation of U.S. patent application Ser. No. 07/381,523, filed on Jul. 18, 1989, now abandoned, in the names of Robert C. Kantner et al., and entitled "A Method of Forming Metal Matrix Composite Bodies by a Self-Generated Vacuum Process, and Products Produced Therefrom". These patent applications and patent disclose a method whereby a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

A method of forming macrocomposite bodies by a somewhat related process is disclosed in Commonly Owned and Copending U.S. patent application Ser. No. 08/021,297, filed on Feb. 22, 1993, as a divisional of Commonly Owned U.S. Pat. No. 5,247,986, entitled "A Method of Forming Macrocomposite Bodies by Self-Generated Vacuum Techniques, and Products Produced Therefrom" which issued Sep. 28, 1993, in the names of Robert C. Kantner et al. from U.S. patent application Ser. No. 07/824,686, filed on Jan. 21, 1992, which was filed as a continuation of U.S. patent application Ser. No. 07/383,935 (now abandoned); and U.S. Pat. No. 5,188,164, issued Feb. 23, 1993, in the names of Robert C. Kantner et al. and entitled "A Method of Forming Macrocomposite Bodies by Self-Generated Vacuum Techniques using a Glassy Seal" from U.S. patent application Ser. No. 07/560,746, filed on Jul. 31, 1990, which was filed as a continuation of U.S. patent application Ser. No. 07/383,935 (now abandoned); in the names of Robert C. Kantner et al., and entitled "A Method of Forming Macrocomposite Bodies By Self-Generated Vacuum Techniques, and Products Produced Therefrom". These patent applications and patents disclose a method whereby a molten matrix metal is contacted with a filler material or a preform, optionally in contact with a second or additional body, in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. The infiltrated material may be bonded to the carcass of the matrix metal and/or the second or additional body thereby forming a macrocomposite body. Such self-generated vacuum infiltration occurs without the application of any external pressure or vacuum.

The entire disclosures of the above-described Commonly-Owned Patents and Patent Applications are expressly incorporated herein by reference.

SUMMARY OF THE INVENTION

The present invention provides a solution to the problems associated with unwanted, undesirable impurity inclusions in composite melts. Accordingly, the present invention possesses particular utility for the recycling of metal matrix composites. Moreover, the present invention addresses and remedies some of the drawbacks and shortcomings of the present techniques for purifying and recycling metal matrix composites. For example, the present invention does not rely upon techniques which attempt to differentiate between harmful impurity inclusions and desirable reinforcement particles.

According to the method of the present invention, harmful impurity inclusions and, in particular, those due to incorporation of dross "skins" are rendered substantially benign but are not removed or even attempted to be removed from the composite melt. Specifically, the harmful inclusions are rendered substantially benign by comminuting the inclusions in situ in the composite melt until the size of the inclusions are such that, taken as a whole, the comminuted inclusions at worst have no more than a nominal negative impact on the properties of the composite melt and the castings made therefrom. Under ideal conditions, it is possible that the presence of comminuted inclusions could even improve quality somewhat. The comminuted impurity particles are then dispersed throughout the melt. One technique for comminuting and dispersing the impurity inclusions is by means of a rotating impeller. In a particularly simple and preferred embodiment, the same impeller which is employed for dispersing the reinforcement filler material throughout the composite melt is also employed to comminute and disperse the impurity inclusions.

As the cast metal matrix composite community now generally recognizes, the purification techniques which have been developed over the years for ordinary metal casting systems usually cannot be directly transferred in unmodified form to composite melt systems without creating certain problems, specifically and typically, the problem of de-wetting of the reinforcement filler. The key to the present invention lies in an entirely different approach to the solution of the impurity problem. The present invention provides an entirely different solution in part because the invention recognizes the problems associated with the impurity inclusions from a different perspective than the prior art. Specifically, because the techniques heretofore developed for purifying metal matrix composite melts are based upon modification of techniques developed for ordinary unreinforced casting melts, their focus has been on removing such impurities from the composite melt. In contrast, the instant invention recognizes that the presence of impurity inclusions in the composite melt is, in and of itself, not per se damaging to the composite casting system. The present invention appreciates that, in finely divided and dispersed form, the impurity inclusions do not appreciably alter the character of the composite melt or the metal matrix composite bodies cast from the composite melt. This invention recognizes that it is the size of the impurity inclusions which is potentially threatening to the quality of the composite melt and the castings made therefrom. Accordingly, the present invention recognizes that a solution to the problem of the presence of such inclusions may simply take the form of reducing the size of such impurities to some "safe" size and dispersing throughout the composite melt the impurity inclusions which have been thusly rendered substantially non-harmful and possibly even somewhat helpful.

Definitions

As used in the present specification and the appended claims, the terms below are defined as follows:

"Agglomerate", as used herein, means a group or plurality of filler material entities adhered to one another.

"Alloy Side", as used herein, refers to that side of a metal matrix composite or ceramic matrix composite which initially contacted molten metal before that molten metal infiltrated the permeable mass of filler material or preform.

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein in conjunction with the formation of metal matrix composites by a spontaneous infiltration technique, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions. "Barrier" or "barrier means", as used herein in conjunction with the formation of metal matrix composites, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Comminute or Comminution", as used herein, means the subdividing of solid bodies into bodies of smaller and more desirable size.

"Composite Melt", as used herein, means a cast or castable metal matrix composite material having a molten matrix metal phase.

"Dross", as used herein, means the assortment of oxides, fluxes and/or other impurity materials at the surface of a molten metal or a composite melt.

"Filler", as used herein in conjunction with both ceramic matrix composites and metal matrix composites, is intended to include either single constituents or mixtures of constituents which are substantially non-reactive with and/or of limited solubility in the matrix or parent metal and may be single or multi-phase. Fillers may be provided in a wide variety of forms, such as powders, flakes, platelets, microspheres, whiskers, bubbles, fibers, particulates, fiber mats, chopped fibers, spheres, pellets, tubules, refractory cloths, etc., and may be either dense or porous. "Filler" may also include ceramic fillers, such as alumina or silicon carbide, as fibers, chopped fibers, particulates, whiskers, bubbles, spheres, fiber mats, or the like, and coated fillers such as carbon fibers coated with alumina or silicon carbide to protect the carbon from attack, for example, by a molten aluminum matrix metal. Fillers may also include metals.

"High Power or High Intensity Shearing", as used herein, means the application of sufficient shearing power per unit volume to a composite melt or a molten metal matrix composite so as to comminute entrained inclusions.

"Highly Loaded Metal Matrix Composite", as used herein, means a metal matrix composite material which has been formed by the spontaneous infiltration of a matrix metal into a filler material and which filler material has not had any substantial amount of second or additional matrix metal added thereto.

"Inclusion", as used herein, means any solid impurity or contaminant which is dispersed in either solid or molten matrix metal.

"Infiltrating Atmosphere", as used herein, in conjunction with the formation of metal matrix composites by a spontaneous infiltration technique, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, in conjunction with the formation of metal matrix composites by a spontaneous infiltration technique, means a material which promotes or assists in the spontaneous infiltration of a matrix metal into a filler material or preform. An infiltration enhancer may be formed from, for example, (1) a reaction of an infiltration enhancer precursor with an infiltrating atmosphere to form a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the filler material or preform, and/or matrix metal and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration, and the infiltration enhancer may be at least partially reducible by the matrix metal. "Infiltration Enhancer Precursor" or "Precursor to the Infiltration Enhancer", as used herein, in conjunction with the formation of metal matrix composites by a spontaneous infiltration technique, means a material which when used in combination with (1) the matrix metal, (2) the preform or filler material and/or (3) an infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact within the infiltrating atmosphere and/or the preform or filler material and/or the matrix metal. For example, in some matrix metal/infiltration enhancer precursor/infiltrating atmosphere systems, it is desirable for the infiltration enhancer precursor to volatilize at, near, or, in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Matrix Metal" or "Matrix Metal Alloy", as used herein means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, in conjunction with the formation of metal matrix composites by a spontaneous infiltration technique, refers to that combination of materials which exhibits spontaneous infiltration into a preform or filler material. It should be understood that whenever a "\" appears between an exemplary matrix metal, infiltration enhancer precursor and infiltrating atmosphere that, the "\" is used to designate a system or combination of materials which, when combined in a particular manner, exhibits spontaneous infiltration into a preform or filler material.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal or from the parent metal means a metal which does not contain, as a primary constituent, the same metal as the matrix or parent metal (e.g., if the primary constituent of the matrix metal is aluminum, the "different" metal could have a primary constituent of, for example, nickel).

"Nonreactive Vessel for Housing Matrix Metal", as used herein, in conjunction with the formation of metal matrix composites by a spontaneous infiltration technique, means any vessel which can house or contain molten matrix metal under the process conditions and not react with the matrix and/or the infiltrating atmosphere and/or infiltration enhancer precursor and/or filler material or preform in a manner which would be significantly detrimental to the spontaneous infiltration mechanism.

"Preform" or "Permeable Preform", as used herein in conjunction with both metal matrix composite and ceramic matrix composite materials, means a porous mass of filler or filler material which is manufactured with at least one surface boundary which essentially defines a boundary for infiltrating matrix metal, such mass retaining sufficient shape integrity and green strength to provide dimensional fidelity without any external means of support prior to being infiltrated by the matrix metal. The mass should be sufficiently porous to permit infiltration of the matrix metal. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reclaimed Material", as used herein, means the material produced by a metal matrix composite reclamation process, e.g., the reinforcement material and unreinforced matrix metal separated from one another.

"Reclamation", as used herein, refers to the act or process by which the reinforcement and the matrix metal components of a metal matrix composite are separated from one another to recover their value as individual components.

"Recycled Material", refers to the material typically produced by a metal matrix composite recycling process. As used specifically herein, recycled material refers to metal matrix composite material at least a portion of which has been recycled and all of which is ready or is in preparation for casting to form a cast metal matrix composite body.

"Recycling", as used herein, refers to the reprocessing of an existing metal matrix composite body for re-use as another metal matrix composite body. As used herein, the re-use specifically refers to casting the recycled metal matrix composite material to form a cast metal matrix composite body. Recycling a metal matrix composite body therefore recovers or attempts to recover the value of the composite body, not merely its individual components. Hence, recycling and reclamation should be consistent to the mutually exclusive concepts unless indicated otherwise in the text.

"Reservoir", as used herein in conjunction with both metal matrix composite and ceramic matrix composite materials, means a separate body of metal positioned relative to a mass of filler or a preform so that, when the metal is molten, it may flow to replenish, or in some cases to initially provide and subsequently replenish, that portion, segment or source of matrix metal which is in contact with the filler or preform.

"Scrap MMC", as used herein, means a metal matrix composite material having no value other than that of the individual components of the composite or of the composite material itself.

"Spontaneous Infiltration", as used herein, means that the infiltration of matrix metal into the permeable mass of filler or preform occurs without requirement for the application of pressure or vacuum (whether externally applied or internally created).

"Virgin MMC", as used herein, means a metal matrix composite material containing substantially no reclaimed or recycled material.

DETAILED DESCRIPTION OF THE INVENTION AND PREFERRED EMBODIMENTS

Figure 1A:
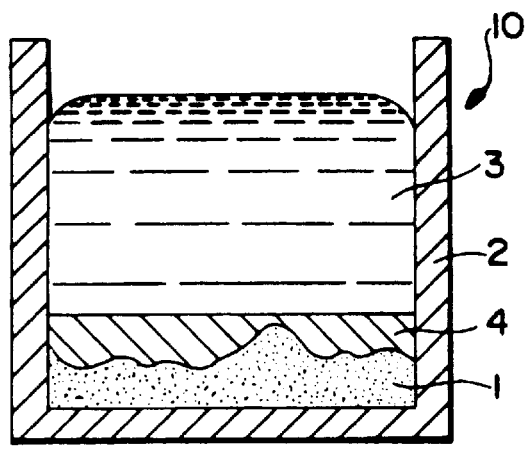
FIG. 1A is a schematic cross-sectional view of a lay-up in accordance with the present invention, illustrating a partially infiltrated composite with excess matrix metal.

The present invention addresses many of the problems associated with harmful impurity inclusions present in a composite melt to be cast as a metal matrix composite. Accordingly, the present invention is of particular utility for the recycling of metal matrix composites. Moreover, the present invention addresses and remedies some of the drawbacks and shortcomings of the presently known techniques for purifying and recycling metal matrix composites.

As the industry now generally recognizes, the purification techniques which have been developed over the years for ordinary metal casting systems usually cannot be directly transferred in unmodified form to composite melt systems without creating problems, specifically and typically, the problem of de-wetting of the reinforcement filler. The key to the present invention lies in an entirely different approach to the solution of the impurity problem. This new approach is provided in part because the present invention recognizes the problems associated with the impurity inclusions from a different perspective than does the prior art. Specifically, because the techniques heretofore developed for purifying metal matrix composite melts are based upon modification of techniques developed for ordinary unreinforced casting melts, their focus has been on removing such impurities from the composite melt. In contrast, the present invention recognizes that the presence of impurity inclusions in the composite melt is, in and of itself, not per se damaging to the composite casting system. Specifically, the total amount of such impurities on a per unit volume basis, for example, is typically quite small. In finely divided and dispersed form, the impurity inclusions do not appreciably worsen the character of the composite melt or the metal matrix composite bodies cast from the composite melt. The present invention thus recognizes that it is usually only the size of the impurity inclusions which is potentially threatening to the quality of the composite melt and the castings made therefrom. Accordingly, the present invention recognizes that the solution to the problem of the presence of such inclusions need only take the form of reducing the size of such impurities to some "safe" size and dispersing throughout the composite melt the impurity inclusions which have been thusly rendered more benign. Comminuted and dispersed in this manner, the impurity inclusions might even have a slight positive effect on melt and casting quality.

According to the method of the present invention then, harmful impurity inclusions and, in particular, those due to incorporation into the composite melt of dross "skins", are not removed or even attempted to be removed from the composite melt, but instead simply rendered more benign. Specifically, the harmful impact of the inclusions is attenuated by comminuting the inclusions in situ in the composite melt until the size of each comminuted inclusion is such, that, taken as a whole, the comminuted inclusions have no more than a negligible adverse impact on the properties of the composite melt and the castings made therefrom. The comminuted impurity particles are then dispersed throughout the melt. One technique for comminuting and dispersing the impurity inclusions is by means of a rotating impeller. In a particularly simple and preferred embodiment, the same impeller which is employed for dispersing the reinforcement filler material throughout the composite melt is also employed to comminute and disperse the impurity inclusions.

The present invention, not being concerned with the processing or compositional history of the metal matrix composite used as raw material, is thus believed to be of particular utility in the recycling of such composites. Moreover, it is believed that the invention disclosed herein is not limited to metal matrix composites produced by the commonly assigned spontaneous infiltration process, but instead, is believed to be generic to all metal matrix composite materials which are capable of displaying or being modified so as to display sufficiently low viscosity as to permit the material to be cast.

The viscosity of a composite melt is dependent upon numerous variables, which variables may or may not be independent of each other. For example, melt viscosity will depend upon such factors as the volume fraction of the melt attributable to solid phases, the morphology of the solid phases in the melt and the surface energy forces between the liquid and solid phases in the melt.

A typical composite melt displaying sufficiently low viscosity such as to be readily amenable to the stirring action of an impeller comprises a particulate reinforcement filler of relatively low volume fraction dispersed in a completely molten matrix metal. The particle morphology of the reinforcement fillers making up a cast metal matrix composite body is not limited to that of particulates, however. Other morphologies such as platelets, whiskers, chopped fibers, flakes, spheres and tubules may be employed as reinforcement fillers and dispersed in a matrix metal as long as such reinforcement filler materials are discontinuous and discrete bodies. Similarly, it is not required that the matrix metal phase of the composite melt be completely molten during processing. In particular, processing (e.g., comminuting, dispersing or casting) may be carried out at a temperature between the liquidus and solidus temperatures of the matrix metal alloy. Processing of composite melts under such conditions is analogous to the M.I.T. Compocasting/process described by Mehrabian et al. in *Metallurgical Transactions*, Vol. 5, No. 8, pp. 1899–1905 (1974). Accordingly, in this temperature region, the solid phases making up the composite melt include not only those phases making up the reinforcement materials but, in addition, a solid matrix metal phase.

Any means which is capable of comminuting sufficiently the impurity inclusions can be considered as a candidate method for carrying out the present invention. A preferred means of comminuting the impurity inclusions is by means of shearing, and a particularly preferred means of shearing the impurity inclusions is by means of an impeller rotating in the composite melt at relatively high speed. "High speed" or "high intensity" shearing means that the impeller is rotating sufficiently fast that effective comminution of impurity inclusions is achieved. For an aluminum alloy melt containing about 30 percent by volume of silicon carbide particulate having a rounded morphology and an average particle size of about 16 microns, this relatively high speed includes impeller tip speeds in the range of about 10 to 16 m/s. Accordingly, given an approximately 5 inch (127 mm) diameter impeller, the rotational speed computes as about 1500 to 2400 revolutions per minute (rpm). Based upon visual and low magnification optical inspections of fractured surfaces of cast metal matrix composite ingots, within this speed range of about 10 to 16 m/s, and for shearing times on the order of about one hour or less, no harmful effect upon the silicon carbide filler material is observed as a result of this shearing operation. Furthermore, at least up to speeds of about 16 m/s, it has been observed that comminuting efficiency increases with shearing rate. Therefore, it would be reasonable to expect that the impurity inclusion comminuting efficiency would further increase with further increases in rotational speed of the impeller during shearing of the composite melt. Therefore the optimum shearing of impurity inclusions may occur at even higher speeds than those presently capable of being attained. In all likelihood, however, there is an upper limit to the desirable or practical shearing speed because beyond this speed the filler material particulates themselves probably begin to be comminuted. For purposes of the present invention, the optimum shearing speed can be taken as that rotational impeller speed which most quickly comminutes the impurity inclusions without significantly comminuting the filler material particulates or creating a potentially deleterious vortex in the composite melt.

The energy available for comminuting impurity inclusions in a composite melt is proportional to the available mechanical energy supplied to the composite melt. One convenient way of expressing this available energy for comminuting is in terms of the shearing energy per unit time per unit volume, or "power density" or "volumetric power density". This quantity can be shown to be proportional to the viscosity of the composite melt and square of the shearing rate applied to the composite melt. The equipment and techniques described herein have been estimated to result in the application of shearing rates of the composite melt of as much as 130 per second. In contrast, some of the metal matrix composite casting literature, particularly the literature pertaining to rheological studies of metal matrix composite melts, reports far higher rates of applied shearing—at least as high as 900 per second. Even when the viscosities of the respective composite melts are taken into account, it is clear that the present inventors are by no means the first to subject a metal matrix composite melt to the volumetric power densities in shear required for comminuting typical impurity inclusions, such as dross skins from (re)melting castings in the absence of a protective atmosphere. Because the rheological studies on composite melts reported in the scientific literature were done under controlled, clear, laboratory conditions, whereas the present invention is carried out under the "dirty" conditions typically encountered in a working foundry, the inventors maintain that they are the first to apply high power shearing to composite melts actually containing significant amounts of noxious impurity inclusions and to observe the beneficial comminuting effect of such shearing on these deleterious inclusions.

Moreover, it would seem to be the case that even if impurity inclusions were present in the composite melts studied Theologically by, for example, Moon, (H. K. Moon, "Rheological Behavior and Microstructure of Ceramic Particulate/Aluminum Alloy Composites," Ph.D. dissertation, M.I.T., June, 1990) such rheological studies nevertheless do not teach the appropriate shearing regime for comminuting such inclusions. Specifically, the present inventors maintain that, there exists a range, a "window" of shear rates which are desired for accomplishing the desired task of comminuting inclusions. The present invention represents an improvement upon the prior art by recognizing that there is both a lower and an upper limit to the shearing rate which may be applied to a composite melt for the purpose of comminuting impurity inclusions. Previous workers have not recognized, in particular, the upper limit of the usable shearing rate. Specifically, the prior art does not appreciate the factors which tend to impose limits on the maximum shear rate which may be applied to a composite melt.

For example, in order to effect shearing of the entire volume at least once of a composite melt of about 70 pounds (32 kg) in a reasonable period of time, the impeller employed must sweep out some minimum amount of surface area in the composite melt per revolution. This requires that the impeller employed must be of a particular minimum size. However, the larger the impeller size, the more power is required to spin such an impeller at a particular speed, and the greater the impeller shaft diameter which is required to withstand such applied power, and therefore the greater is the likelihood of undesirable vortex formation in the composite melt.

Another factor which tends to limit the applied shearing intensity is the onset of reinforcement filler comminution. As the applied volumetric shearing power increases, the size of the solid particles within the composite melt which are capable of being comminuted decreases. Eventually, this size reduces to that of the reinforcement filler and the filler particles start to become comminuted. In most instances, such an effect is undesirable because the desired filler particle size in the cast composite is usually the same as the filler particle size which is used to produce the composite melt. Furthermore, an appreciable amount of undesirable filler material comminution could possibly affect the casting properties of the composite melt and/or the physical properties of the metal matrix composites cast from the composite melt. On the other hand, it is possible that slight to moderate filler material comminution could improve the overall quality of the composite melt or the casting produced therefrom. For instance, this slight comminution of filler might make the particle size distribution of the filler material more amenable to casting of the composite melt, e.g., more fluid. Further, the comminuted particles of filler material or inclusions might serve as grain refiners (e.g., nucleating agents) for producing metal matrix composite castings having a uniform and fine grain size.

The prior art either does not recognize or does not care about such an effect. The instant inventors respectfully submit that, the very high shearing rates employed to characterize the rheological properties of a composite melt could not be used in the present invention for comminuting impurity inclusions because the reinforcement filler (typical comprising 15 micron silicon carbide) would be excessively comminuted along with the impurity inclusions. For the purpose of conducting viscosity studies, such an effect might not be too deleterious if the means for shearing the melt sampled only a small fraction of the entire melt. For purposes of the present invention, however, the means for shearing the melt needs to sample, to "turn over" the entire melt, and the more times, the better.

The production of high quality metal matrix composite castings requires both the comminution of potentially harmful impurity inclusions as well as the substantially uniform dispersion of the comminuted inclusions and the engineered reinforcement filler material throughout the molten matrix metal prior to casting. To meet these two criteria often requires two different sets of shearing conditions.

However, it may be possible to accomplish both the comminuting and dispersing operations using a single impeller under appropriate conditions. For example, if the mixing and homogenization step is carried out using a vaned impeller at relatively low rotational speeds, it may be possible to perform the comminuting step using the same impeller at higher rotational speeds if adequate means are employed to prevent vortex formation. Specifically, it may be possible to avoid such vortex formation by the use of one or more baffles provided within or inserted into the composite melt, or by the use of a stationary sleeve covering the impeller shaft. Similarly, if the single impeller design is selected with an eye towards the comminuting step, it may be possible to achieve mixing and homogenization using the same impeller by increasing the rotational speed even beyond that used for the comminuting step.

In any event, it appears reasonable that the comminuting operation preferably should be carried out before the homogenization operation. Specifically, once the comminuting step has been performed to the desired extent, additional impurity inclusions will not be incorporated into the composite melt as long as care is taken to avoid vortex formation in the composite melt as well as avoiding possible contamination from other sources, (e.g., various pieces of equipment such as impellers, skimmers and ladles) which may, from time to time, need to be inserted into the composite melt. In contrast, once homogenization ceases, both comminuted impurities and the engineered filler materials may begin to settle out of the composite melt. Attempting to cast such a composite melt which has experienced such settling may lead to compositional variations and inhomogeneities in the formed metal matrix composite casting. Accordingly, it appears that the homogenization step should be performed last, i.e., just prior to casting.

Among the numerous advantages of the present invention is the absence of a need for specialty gases to be injected into the composite melt to effect purification. In fact, the present invention can even be practiced without the usual requirement for a protective gas atmosphere, such as argon or nitrogen, above the surface of the melt. Not only does the absence of such a requirement contribute to the overall simplicity and economy of the present invention, but the problem of using potentially hazardous materials such as gaseous chlorides or fluorides, for example, to chemically reduce impurity oxides, is completely avoided.

Another of the several advantages of the present invention is its applicability to the comminution of a wide variety of potentially harmful impurity inclusions. It is well known that dross or oxide skins present on the exterior surfaces of cast metals or metal matrix composites which are to be recycled are not the only form of contaminant which, by being drawn into the composite melt, may form deleterious impurity inclusions within the melt. Specifically, other sources of composite melt contamination include the crucible material used to house the composite melt; the mold wash coatings applied to the casting tools such as the skimmers, ladles, etc; pieces of sand from previous sand castings; and carbonaceous material remaining from pyrolyzed bits of the lubricating greases or oils used in die casting molds, etc. The present invention may be useful in comminuting each of these forms of solid impurities. In contrast, gaseous removal techniques may not be amenable to removing each of these kinds of impurity inclusions. For example, some of the above-described impurity inclusions may not be amenable to chemical reduction by the gases bubbled into the melt as would the drosses or other oxide skins. Entrapped oxide skins might also be removed by the buoyancy effect provided by the introduced gas bubbles attaching themselves to an oxide skin and causing it to float to the surface of the composite melt. Other forms of impurity inclusions, however, may not have the surface area to volume ratio of an oxide skin which would be conducive to this "flotation" technique. Thus, the present invention might be expected to have broader applicability than techniques which rely on bubbling gases through the composite melt for impurity removal.

Although the present invention may be employed in connection with composite melts which have never been cast previously, e.g., virgin metal matrix composite material, such as, for example, to render harmless an oxide skin which inadvertently has been drawn into the composite melt, a very attractive feature of the present invention is in its application toward recycling existing or previously manufactured metal matrix composites and, in particular, pre-existing cast metal matrix composites, e.g., scrap. In particular, the present invention may be used in reheats which comprise up to 100 percent scrap metal matrix composite materials.

In a melt comprising at least some scrap material, the order in which the crucible is charged seems to be immaterial to carrying out the present invention. Specifically, in one embodiment, all of the metal matrix composite materials charged to the crucible (both virgin and scrap materials) are added in solid form and then rendered molten. In other embodiments, either virgin or scrap metal matrix composite castings may be charged in solid form to a crucible already containing some molten composite material, which melt in turn may comprise either virgin or scrap metal matrix composite material. When this latter embodiment is employed, however, i.e., that of adding solid metal matrix composite material to molten, care must be exercised to prevent the composite melt from freezing completely, otherwise subsequent remelting/reheating may crack the crucible because of the different thermal expansion coefficients. Accordingly, it may be necessary or desirable to 1) superheat the composite melt; 2) preheat the metal matrix composite materials to be added to the composite melt; 3) add the solid composite materials incrementally or 4) some combination of the above techniques.

Although the present invention may be used to advantage with virtually any castable metal matrix composite material, a particularly preferred application is for use in conjunction with cast metal matrix composite materials made by a spontaneous infiltration process. As discussed previously, with particular regard to Commonly Owned U.S. Pat. Nos.

5,222,542 and 5,000,247, a metal matrix composite body is formed by first spontaneously infiltrating a filler material with a first matrix metal in an infiltrating atmosphere and thereafter adding additional or second matrix metal to the infiltrated filler material to result in a suspension of lower volume fraction of filler material and matrix metal. Furthermore, as discussed in detail below, the addition of the additional or second matrix metal enables the process to be tailored to provide a metal matrix of the first matrix metal (i.e., where the first and second matrix metals are the same) or an intermetallic or alloy of the first and second matrix metals (i.e., where the first and second matrix metals are different).

As a first step in the process for obtaining low particle loading metal matrix composites, spontaneous infiltration of a filler material or preform is initiated.

With reference to the figures, FIG. 1A illustrates a lay-up (10) which could be used in accordance with the present invention. Specifically, a filler material (or preform) (1) is provided in a mold or container (2), which is substantially non-reactive with the components. A matrix metal (3) is provided, and is heated above its melting point under conditions which enable spontaneous infiltration to occur, as discussed in more detail below. As the matrix metal begins to spontaneously infiltrate the filler material or preform, a metal matrix composite (4) is formed (e.g., if the matrix metal was permitted to cool, at least the portion (4) would comprise a metal matrix composite).

In a first preferred embodiment of the invention, an excess of matrix metal (3) is provided, such that upon completion of spontaneous infiltration, a carcass of uninfiltrated matrix metal remains.

Figure 1B:
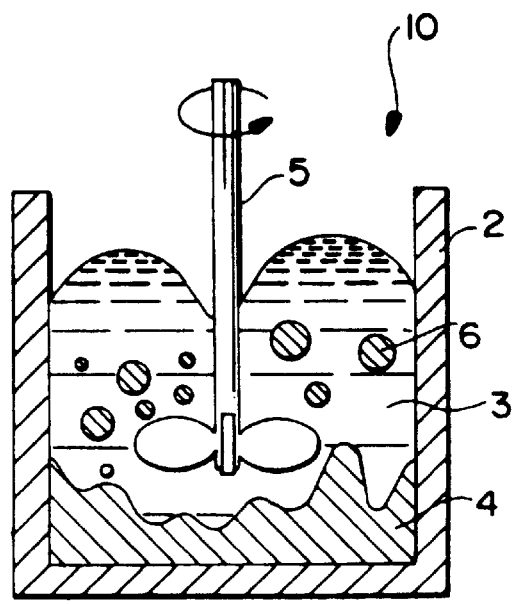
FIG. 1B is a schematic cross-sectional view illustrating the dispersion of an infiltrated composite and excess matrix metal.
Figure 1C:
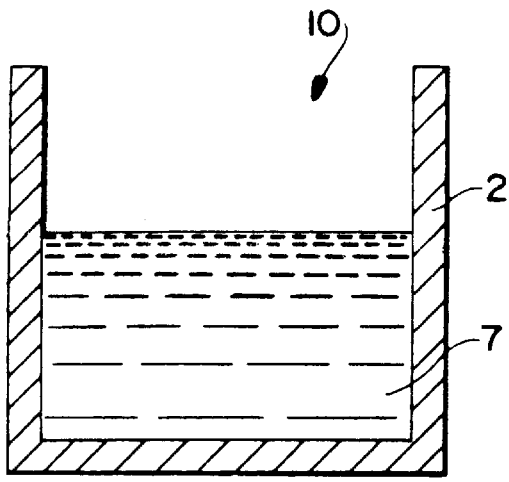
FIG. 1C is a schematic cross-sectional view of the dispersed infiltrated composite before further processing.

As illustrated in FIG. 1B, the matrix metal composite, while still molten, is admixed with excess matrix metal via a stirrer (5), such that the infiltrated filler material is dispersed into the additional matrix metal to form a suspension. Stirrer (5) can be any conventional stirring apparatus, including mechanical stirring means, ultrasonic stirring means or hand stirring. Stirring is continued for 1 to 15 minutes, and preferably for 10 to 15 minutes, or until a homogeneous, fully dispersed mixture (7) is obtained, as illustrated by FIG. 1C.

Stirring should preferably be undertaken at spontaneous infiltration process temperatures (discussed below) to avoid hardening of the composite before dispersion of the mixture is complete. Such stirring could be effected, for example, via overhead stirring means provided in the furnace. Alternatively, if stirring is not performed at process temperatures, procedures should be undertaken to avoid premature cooling, including the use of heated stirring apparatus and wellinsulated containment vessels, etc.

Figure 1D:
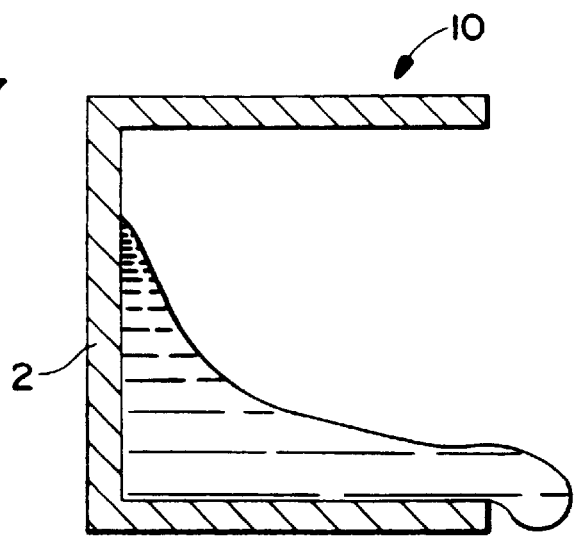
FIG. 1D is a schematic cross-sectional view illustrating the pourability of the dispersed composite.

After substantially complete dispersion is achieved, the dispersed mixture can be poured, as illustrated in FIG. 1D, into a mold to form a body having a lower particle loading than is otherwise obtainable via spontaneous infiltration. Any conventional mold can be used, such as investment shell molds, split shell molds, multiple piece molds, reusable molds, and the like. The molds, preferably, are heated to delay cooling of the dispersed composite to maximize pour times and workability of the poured dispersed composite. Alternatively, room temperature molds or cooled molds, e.g., a copper chill plate, can be utilized if quicker cooling is desired in a particular application.

In an alternative embodiment, the container in which the composite is dispersed corresponds to the ultimate desired shape of the body to be formed. Accordingly, rather than pouring the suspension of filler material and matrix metal, it is allowed to cool in the container, such that the container performs the function of the mold. Alternatively, the suspension can be allowed to cool, and can thereafter be reheated above its melting point and poured or molded for further processing or forming. Moreover, the suspension can be poured into a mold to form an intermediate body, e.g., an ingot, which can thereafter be used as a precursor to further processing.

The resulting composite from the above embodiments exhibits the highly desirable properties associated with other spontaneously infiltrated composites. Moreover, lower particle loadings are obtainable, e.g., of the order of 5 to 40 volume percent, using the dispersion methods of the present invention.

In a further embodiment of the present invention, an excess of matrix metal is not used as in FIG. 1A. Instead, a bed of filler material or a preform is spontaneously infiltrated and allowed to cool to form a highly loaded metal matrix composite. The highly loaded metal matrix composite is thereafter reheated and additional matrix metal is dispersed therein in accordance with the procedures discussed above to create a suspension of filler material and matrix metal, said suspension being capable of forming a low particle loading metal matrix composite (e.g., by a casting method). Alternatively, the additional matrix metal can be added while the matrix metal in the infiltrated composite is still in its liquid state.

The additional or second matrix metal in all of the above embodiments can have a composition which is the same as, similar to or quite different from the matrix metal which spontaneously infiltrates the filler or preform. Through the use of different first and second matrix metals, the resultant three dimensionally interconnected metal matrix of the metal matrix composite can be varied to provide any of a variety of alloys or intermetallics to suit a particular application. As a result, desired chemical, electrical, mechanical and other properties can be tailored to suit a particular application. The second matrix metal is, preferably, a metal which is miscible with the first matrix metal.

The second matrix metal can be introduced in many different ways. With reference to FIG. 1A, matrix metal (3) could be a multi-phase molten alloy having stratified layers comprised at its surface adjacent to the interface with the filler of a first matrix metal, but having at its upper end a second matrix metal. The first matrix metal can be, for example, rich in infiltration enhancer and/or infiltration enhancer precursor and/or secondary alloys which promote infiltration. After the first matrix metal spontaneously infiltrates, the second or additional matrix metal can be admixed to the suspension in accordance with FIG. 1B.

Alternatively, the second or additional matrix metal can be poured in or added in its solid form and liquefied, after spontaneous infiltration has occurred. Moreover, as discussed above, a metal matrix composite can be formed and cooled and, in a subsequent processing step, the composite can be reheated and the second or additional matrix metal can be dispersed into the suspension.

Without wishing to be bound by any particular theory or explanation as to the specific mechanism by which spontaneous infiltration occurs, when an infiltration enhancer precursor is utilized in combination with at least one of the matrix metal, and/or filler material or preform and/or infiltrating atmosphere, the infiltration enhancer precursor may react to form an infiltration enhancer which induces or assists molten matrix metal to spontaneously infiltrate a filler material or preform. Moreover, it appears as though it may be necessary for the precursor to the infiltration enhancer to be capable of being positioned, located or transportable to a location which permits the infiltration enhancer precursor to interact with at least one of the infiltrating atmosphere, and/or the preform or filler material, and/or molten matrix metal. For example, in some matrix metal/infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

Thus, for example, if an infiltration enhancer precursor was included or combined with, at least at some point during the process, molten matrix metal, it is possible that the infiltration enhancer could volatilize from the molten matrix metal and react with at least one of the filler material or preform and/or the infiltrating atmosphere. Such reaction could result in the formation of a solid species, if such solid species was stable at the infiltration temperature, said solid species being capable of being deposited on at least a portion of the filler material or preform as, for example, a coating. Moreover, it is conceivable that such solid species could be present as a discernable solid within at least a portion of the preform or filler material. If such a solid species was formed, molten matrix metal may have a tendency to react (e.g., the molten matrix metal may reduce the formed solid species) such that infiltration enhancer precursor may become associated with (e.g., dissolved in or alloyed with) the molten matrix metal. Accordingly, additional infiltration enhancer precursor may then be available to volatilize and react with another species (e.g., the filler material or preform and/or infiltrating atmosphere) and again form a similar solid species. It is conceivable that a continuous process of conversion of infiltration enhancer precursor to infiltration enhancer followed by a reduction reaction of the infiltration enhancer with molten matrix metal to again form additional infiltration enhancer, and so on, could occur, until the result achieved is a spontaneously infiltrated metal matrix composite.

In order to effect spontaneous infiltration of the matrix metal into the filler material or preform, an infiltration enhancer should be provided to the spontaneous system. An infiltration enhancer could be formed from an infiltration enhancer precursor which could be provided (1) in the matrix metal; and/or (2) in the filler material or preform; and/or (3) from the infiltrating atmosphere; and/or (4) from an external source into the spontaneous system. Moreover, rather than supplying an infiltration enhancer precursor, an infiltration enhancer may be supplied directly to at least one of the filler material or preform, and/or matrix metal, and/or infiltrating atmosphere. Ultimately, at least during the spontaneous infiltration, the infiltration enhancer should be located in at least a portion of the filler material or preform.

In a preferred embodiment of the invention, it is possible that the infiltration enhancer precursor can be at least partially reacted with the infiltrating atmosphere such that the infiltration enhancer can be formed in at least a portion of the filler material or preform prior to or substantially contiguous with contacting the filler material or preform with the matrix metal (e.g., if magnesium was the infiltration enhancer precursor and nitrogen was the infiltrating atmosphere, the infiltration enhancer could be magnesium nitride which would be located in at least a portion of the preform or filler material).

An example of a matrix metal/infiltration enhancer precursor/infiltrating atmosphere system is the aluminum/magnesium/nitrogen system. Specifically, an aluminum matrix metal can be contained within a suitable refractory vessel which, under the process conditions, does not adversely react with the aluminum matrix metal and/or the filler material when the aluminum is made molten. A filler material or preform can thereafter be contacted with molten aluminum matrix metal and spontaneously infiltrated.

Moreover, rather than supplying an infiltration enhancer precursor, an infiltration enhancer may be supplied directly to at least one of the preform or filler material, and/or matrix metal, and/or infiltrating atmosphere. Ultimately, at least during the spontaneous infiltration, the infiltration enhancer should be located in at least a portion of the filler material or preform.

Under the conditions employed in the method of the present invention, in the case of an aluminum/magnesium/nitrogen spontaneous infiltration system, the preform or filler material should be sufficiently permeable to permit the nitrogen-containing gas to penetrate or permeate the filler material or preform at some point during the process and/or contact the molten matrix metal. Moreover, the permeable filler material or preform can accommodate infiltration of the molten matrix metal, thereby causing the nitrogen-permeated preform to be infiltrated spontaneously with molten matrix metal to form a metal matrix composite body and/or cause the nitrogen to react with an infiltration enhancer precursor to form infiltration enhancer in the filler material or preform and thereby result in spontaneous infiltration. The extent of spontaneous infiltration and formation of the metal matrix composite will vary with a given set of process conditions, including magnesium content of the aluminum alloy, magnesium content of the preform or filler material, amount of magnesium nitride in the preform or filler material, the presence of additional alloying elements (e.g., silicon, iron, copper, manganese, chromium, zinc, and the like), average size of the filler material (e.g., particle diameter) comprising the preform or the filler material, surface condition and type of filler material or preform, nitrogen concentration of the infiltrating atmosphere, time permitted for infiltration and temperature at which infiltration occurs. For example, for infiltration of the molten aluminum matrix metal to occur spontaneously, the aluminum can be alloyed with at least about 1 percent by weight, and preferably at least about 3 percent by weight, magnesium (which functions as the infiltration enhancer precursor), based on alloy weight. Auxiliary alloying elements, as discussed above, may also be included in the matrix metal to tailor specific properties thereof. Additionally, the auxiliary alloying elements may affect the minimum amount of magnesium required in the matrix aluminum metal to result in spontaneous infiltration of the filler material or preform. Loss of magnesium from the spontaneous system due to, for example, volatilization should not occur to such an extent that no magnesium was present to form infiltration enhancer. Thus, it is desirable to utilize a sufficient amount of initial alloying elements to assure that spontaneous infiltration will not be adversely affected by volatilization. Still further, the presence of magnesium in both of the preform (or filler material) and matrix metal or the preform (or filler material) alone may result in a reduction in required amount of magnesium to achieve spontaneous infiltration (discussed in greater detail later herein).

The volume percent of nitrogen in the infiltrating atmosphere also affects formation rates of the metal matrix composite body. Specifically, if less than about 10 volume percent of nitrogen is present in the atmosphere, very slow or little spontaneous infiltration will occur. It has been discovered that it is preferable for at least about 50 volume percent of nitrogen to be present in the atmosphere, thereby resulting in, for example, shorter infiltration times due to a much more rapid rate of infiltration. The infiltrating atmosphere (e.g., a nitrogen-containing gas) can be supplied directly to the filler material or preform and/or matrix metal, or it may be produced or result from a decomposition of a material.

The minimum magnesium content required for the molten matrix metal to infiltrate a filler material or preform depends on one or more variables such as the processing temperature, time, the presence of auxiliary alloying elements such as silicon or zinc, the nature of the filler material, the location of the magnesium in one or more components of the spontaneous system, the nitrogen content of the atmosphere, and the rate at which the nitrogen atmosphere flows. Lower temperatures or shorter heating times can be used to obtain complete infiltration as the magnesium content of the alloy and/or preform is increased. Also, for a given magnesium content, the addition of certain auxiliary alloying elements such as zinc permits the use of lower temperatures. For example, a magnesium content of the matrix metal at the lower end of the operable range, e.g., from about 1 to 3 weight percent, may be used in conjunction with at least one of the following: an above-minimum processing temperature, a high nitrogen concentration, or one or more auxiliary alloying elements. When no magnesium is added to the preform, alloys containing from about 3 to 5 weight percent magnesium are preferred on the basis of their general utility over a wide variety of process conditions, with at least about 5 percent being preferred when lower temperatures and shorter times are employed. Magnesium contents in excess of about 10 percent by weight of the aluminum alloy may be employed to moderate the temperature conditions required for infiltration. The magnesium content may be reduced when used in conjunction with an auxiliary alloying element, but these elements serve an auxiliary function only and are used together with at least the above-specified minimum amount of magnesium. For example, there was substantially no infiltration of nominally pure aluminum alloyed only with 10 percent silicon at 1000° C. into a bedding of 500 mesh, 39 Crystolon™ (99 percent pure silicon carbide from Norton Co.). However, in the presence of magnesium, silicon has been found to promote the infiltration process. As a further example, the amount of magnesium varies if it is supplied exclusively to the preform or filler material. It has been discovered that spontaneous infiltration will occur with a lesser weight percent of magnesium supplied to the spontaneous system when at least some of the total amount of magnesium supplied is placed in the preform or filler material. It may be desirable for a lesser amount of magnesium to be provided in order to prevent the formation of undesirable intermetallics in the metal matrix composite body. In the case of a silicon carbide preform, it has been discovered that when the preform is contacted with an aluminum matrix metal, the preform containing at least about 1% by weight magnesium and being in the presence of a substantially pure nitrogen atmosphere, the matrix metal spontaneously infiltrates the preform. In the case of an alumina preform, the amount of magnesium required to achieve acceptable spontaneous infiltration is slightly higher. Specifically, it has been found that when an alumina preform, when contacted with a similar aluminum matrix metal, at about the same temperature as the aluminum that infiltrated into the silicon carbide preform, and in the presence of the same nitrogen atmosphere, at least about 3% by weight magnesium may be required to achieve similar spontaneous infiltration to that achieved in the silicon carbide preform discussed immediately above.

It is also noted that it is possible to supply to the spontaneous system infiltration enhancer precursor and/or infiltration enhancer on a surface of the alloy and/or on a surface of the preform or filler material and/or within the preform or filler material prior to infiltrating the matrix metal into the filler material or preform (i.e., it may not be necessary for the supplied infiltration enhancer or infiltration enhancer precursor to be alloyed with the matrix metal, but rather, simply supplied to the spontaneous system). For example, in the aluminum/mangesium/nitrogen system, if the magnesium was applied to a surface of the matrix metal it may be preferred that the surface should be the surface which is closest to, or preferably in contact with, the permeable mass of filler material or vice versa; or such magnesium could be mixed into at least a portion of the preform or filler material. Still further, it is possible that some combination of surface application, alloying and placement of magnesium into at least a portion of the preform could be used. Such combination of applying infiltration enhancer(s) and/or infiltration enhancer precursor(s) could result in a decrease in the total weight percent of magnesium needed to promote infiltration of the matrix aluminum metal into the preform, as well as achieving lower temperatures at which infiltration can occur. Moreover, the amount of undesirable intermetallics formed due to the presence of magnesium could also be minimized.

The use of one or more auxiliary alloying elements and the concentration of nitrogen in the surrounding gas also affects the extent of nitriding of the matrix metal at a given temperature. For example, auxiliary alloying elements such as zinc or iron included in the alloy, or placed on a surface of the alloy, may be used to reduce the infiltration temperature and thereby decrease the amount of nitride formation, whereas increasing the concentration of nitrogen in the gas may be used to promote nitride formation.

The concentration of magnesium in the alloy, and/or placed onto a surface of the alloy, and/or combined in the filler or preform material, also tends to affect the extent of infiltration at a given temperature. Consequently, in some cases where little or no magnesium is contacted directly with the preform or filler material, it may be preferred that at least about three weight percent magnesium be included in the alloy. Alloy contents of less than this amount, such as one weight percent magnesium, may require higher process temperatures or an auxiliary alloying element for infiltration. The temperature required to effect the spontaneous infiltration process of this invention may be lower: (1) when the magnesium content of the alloy alone is increased, e.g., to at least about 5 weight percent; and/or (2) when alloying constituents are mixed with the permeable mass of filler material or preform; and/or (3) when another element such as zinc or iron is present in the aluminum alloy. The temperature also may vary with different filler materials. In general, in the aluminum/magnesium/nitrogen system spontaneous and progressive infiltration will occur at a process temperature of at least about 675° C., and preferably a process temperature of at least about 750° C.–800° C. Temperatures generally in excess of 1200° C. do not appear to benefit the process, and a particularly useful temperature range has been found to be from about 675° C. to about 1000° C. However, as a general rule, the spontaneous infiltration temperature is a temperature which is above the melting point of the matrix metal but below the volatilization temperature of the matrix metal. Moreover, the spontaneous infiltration temperature should be below the melting point of the filler material. Still further, as temperature is increased, the tendency to form a reaction product between the matrix metal and infiltrating atmosphere increases (e.g., in the case of aluminum matrix metal and a nitrogen infiltrating atmosphere, aluminum nitride may be formed). Such reaction product may be desirable or undesirable based upon the intended application of the metal matrix composite body. Additionally, electric resistance heating is typically used to achieve the infiltrating temperatures. However, any heating means which can cause the matrix metal to become molten and does not adversely affect spontaneous infiltration, is acceptable for use with the invention.

In a preferred embodiment of the spontaneous infiltration process, for example, a permeable filler material or preform comes into contact with molten aluminum in the presence of, at least sometime during the process, a nitrogen-containing gas. The nitrogen-containing gas may be supplied by maintaining a continuous flow of gas into contact with at least one of the filler material or preform and/or molten aluminum matrix metal. Although the flow rate of the nitrogen-containing gas is not critical, it is preferred that the flow rate be sufficient to compensate for any nitrogen lost from the atmosphere due to any nitride formation, and also to prevent or inhibit the incursion of air which can have an oxidizing effect on the molten metal.

The method of forming a metal matrix composite is applicable to a wide variety of filler materials, and the choice of filler materials will depend on such factors as the matrix alloy, the process conditions, the reactivity of the molten matrix alloy with the filler material, and the properties sought for the final composite product. For example, when aluminum is the matrix metal, suitable filler materials include (a) oxides, e.g. alumina, magnesia, zirconia; (b) carbides, e.g. silicon carbide; (c) borides, e.g. aluminum dodecaboride, titanium diboride, and (d) nitrides, e.g. aluminum nitride, and (e) mixtures thereof. If there is a tendency for the filler material to react with the molten aluminum matrix metal, this might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, borides and nitrides. Ceramics which are preferred for use in the present method include alumina and silicon carbide in the form of particles, platelets, whiskers and fibers. The fibers can be discontinuous (in chopped form) or in the form of continuous filament, such as multifilament tows. Further, the filler material or preform may be homogeneous or heterogeneous.

It also has been discovered that certain filler materials exhibit enhanced infiltration relative to filler materials having a similar chemical composition. For example, crushed alumina bodies made by the method disclosed in U.S. Pat. No. 4,713,360, entitled "Novel Ceramic Materials and Methods of Making Same", which issued on Dec. 15, 1987, in the names of Marc S. Newkirk et al., exhibit desirable infiltration properties relative to commercially available alumina products. Moreover, crushed alumina bodies made by the method disclosed in Copending and Commonly Owned application Ser. No. 819,397, entitled "Composite Ceramic Articles and Methods of Making Same", in the names of Marc S. Newkirk et al., also exhibit desirable infiltration properties relative to commercially available alumina products. The subject matter of each of the issued Patent and Copending Patent Application is herein expressly incorporated by reference. Thus, it has been discovered that complete infiltration of a permeable mass of ceramic material can occur at lower infiltration temperatures and/or lower infiltration times by utilizing a crushed or comminuted body produced by the method of the aforementioned U.S. Patent and Patent Application.

The size, shape, chemistry and volume percent of the filler material (or preform) can be any that may be required to achieve the properties desired in the composite. Thus, the filler material may be in the form of particles, whiskers, platelets or fibers since infiltration is not restricted by the shape of the filler material. Other shapes such as spheres, tubules, pellets, refractory fiber cloth, and the like may be employed. In addition, the size of the filler material does not limit infiltration, although a higher temperature or longer time period may be needed for complete infiltration of a mass of smaller particles than for larger particles or vice-versa depending on the particular reaction conditions. Average particle diameters as small as a micron or less to about 1100 microns or more can be successfully utilized in the present invention, with a range of about 2 microns through about 1000 microns being preferred for a vast majority of commercial applications. Further, the mass of filler material (or preform) to be infiltrated should be permeable (i.e., contain at least some interconnected porosity to render it permeable to molten matrix metal and/or to the infiltrating atmosphere). Moreover, by controlling the size (e.g., particle diameter) and/or geometry and/or composition of the filler material or the material comprising the preform, the physical and mechanical properties of the formed metal matrix composite can be controlled or engineered to meet any number of industrial needs. For example, wear resistance of the metal matrix composite can be increased by increasing the size of the filler material (e.g., increasing the average diameter of the filler material particles) given that the filler material has a higher wear resistance than the matrix metal. However, strength and/or toughness may tend to increase with decreasing filler size. Further, the thermal expansion coefficient of the metal matrix composite may decrease with increasing filler loading, given that the coefficient of thermal expansion of the filler is lower than the coefficient of thermal expansion of the matrix metal. Still further, the mechanical and/or physical properties (e.g., density, coefficient of thermal expansion, elastic and/or specific modulus, strength and/or specific strength, etc.) of a formed metal matrix composite body may be tailored depending on the loading of the filler material in the loose mass or in the preform. For example, by providing a loose mass or preform comprising a mixture of filler particles of varying sizes and/or shapes, wherein the density of the filler is greater than that of the matrix metal, a higher filler loading, due to enhanced packing of the filler materials, may be achieved, thereby resulting in a metal matrix composite body with an increased density. By utilizing the teachings of the present invention, the volume percent of filler material or preform which can be infiltrated can vary over a wide range. The lower volume percent of filler that can be infiltrated is limited primarily by the ability to form a porous filler material or preform, (e.g., about 10 volume percent); whereas the higher volume percent of filler or preform that can be infiltrated is limited primarily by the ability to form a dense filler material or preform with at least some interconnected porosity (e.g., about 95 volume percent). Accordingly, by practicing any of the above teachings, alone or in combination, a metal matrix composite can be engineered to contain a desired combination of properties.

It has been observed that for aluminum infiltration and matrix formation around a ceramic filler, wetting of the ceramic filler by the aluminum matrix metal may be an important part of the infiltration mechanism. Further, the wetting of the filler by molten matrix metal may permit a uniform dispersion of the filler throughout the formed metal matrix composite and improve the bonding of the filler to the matrix metal. Moreover, at low processing temperatures, a negligible or minimal amount of metal nitriding occurs resulting in a minimal discontinuous phase of aluminum nitride dispersed in the metal matrix. However, as the upper end of the temperature range is approached, nitridation of the metal is more likely to occur. Thus, the amount of the nitride phase in the metal matrix can be controlled by varying the processing temperature at which infiltration occurs. The specific process temperature at which nitride formation becomes more pronounced also varies with such factors as the matrix aluminum alloy used and its quantity relative to the volume of filler or preform, the filler material to be infiltrated, and the nitrogen concentration of the infiltrating atmosphere. For example, the extent of aluminum nitride formation at a given process temperature is believed to increase as the ability of the alloy to wet the filler decreases and as the nitrogen concentration of the atmosphere increases.

It is therefore possible to tailor the constituency of the metal matrix during formation of the composite to impart certain characteristics to the resulting product. For a given system, the process conditions can be selected to control the nitride formation. A composite product containing an aluminum nitride phase will exhibit certain properties which can be favorable to, or improve the performance of, the product. Further, the temperature range for spontaneous infiltration with an aluminum alloy may vary with the ceramic material used. In the case of alumina as the filler material, the temperature for infiltration should preferably not exceed about 1000° C. if it is desired that the ductility of the matrix not be reduced by the significant formation of nitride. However, temperatures exceeding 1000° C. may be employed if it is desired to produce a composite with a less ductile and stiffer matrix. To infiltrate silicon carbide, higher temperatures of about 1200° C. may be employed since the aluminum alloy nitrides to a lesser extent, relative to the use of alumina as filler, when silicon carbide is employed as a filler material.

Further, the constituency of the matrix metal within the metal matrix composite and defects, for example, porosity, may be modified by controlling the cooling rate of the metal matrix composite. For example, the metal matrix composite may be directionally solidified by any number of techniques including: placing the container holding the metal matrix composite upon a chill plate; and/or selectively placing insulating materials about the container. Further, the constituency of the metal matrix may be modified after formation of the metal matrix composite. For example, exposure of the formed metal matrix composite to a heat treatment may improve the tensile strength of the metal matrix composite. (The standard test for tensile strength is ASTM-D3552-77 (reapproved 1982).)

For example, a desirable heat treatment for a metal matrix composite containing a 520.0 aluminum alloy as the matrix metal may comprise heating the metal matrix composite to an elevated temperature, for example, to about 430° C., which is maintained for an extended period (e.g., 18–20 hours). The metal matrix may then be quenched in boiling water at about 100° C. for about 20 seconds (i.e., a T-4 heat treatment) which can temper or improve the ability of the composite to withstand tensile stresses.

Moreover, it is possible to use a reservoir of matrix metal to assure complete infiltration of the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which was molten at the processing temperature could be used as the reservoir metal. Molten metals frequently are very miscible with each other which would result in the reservoir metal mixing with the first source of matrix metal so long as an adequate amount of time is given for the mixing to occur. Thus, by using a reservoir metal which is different in composition from the first source of matrix metal, it is possible to tailor the properties of the metal matrix to meet various operating requirements and thus tailor the properties of the metal matrix composite.

A barrier means may also be utilized in combination with the present invention. Specifically, the barrier means for use with this invention may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process, as well as being capable of locally inhibiting, stopping, interfering with, preventing, or the like, continued infiltration or any other kind of movement beyond the defined surface boundary of the ceramic filler. Barrier means may be used during spontaneous infiltration or in any molds or other fixtures utilized in connection with casting of the spontaneously infiltrated metal matrix composite, as discussed in greater detail below.

Suitable barrier means includes materials which are substantially non-wettable by the migrating molten matrix alloy under the process conditions employed. A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product. As stated above, the barrier preferably should be permeable or porous, or rendered permeable by puncturing, to permit the gas to contact the molten matrix alloy.

Suitable barriers particularly useful for aluminum matrix alloys are those containing carbon, especially the crystalline allotropic form of carbon known as graphite. Graphite is essentially non-wettable by the molten aluminum alloy under the described process conditions. A particular preferred graphite is a graphite foil product that is sold under the trademark Grafoil®, registered to Union Carbide. This graphite foil exhibits sealing characteristics that prevent the migration of molten aluminum alloy beyond the defined surface boundary of the filler material. This graphite foil is also resistant to heat and is chemically inert. Grafoil® graphite foil is flexible, compatible, conformable and resilient. It can be made into a variety of shapes to fit any barrier application. However, graphite barrier means may be employed as a slurry or paste or even as a paint film around and on the boundary of the filler material or preform. Grafoil® is particularly preferred because it is in the form of a flexible graphite sheet. In use, this paper-like graphite is simply formed around the filler material or preform.

Other preferred barrier(s) for aluminum metal matrix alloys in nitrogen are the transition metal borides (e.g., titanium diboride ($TiB_2$)) which are generally non-wettable by the molten aluminum metal alloy under certain of the process conditions employed using this material. With a barrier of this type, the process temperature should not exceed about 875° C., for otherwise the barrier material becomes less efficacious and, in fact, with increased temperature infiltration into the barrier will occur. Moreover, the particle size of the barrier material may affect the ability of the material to inhibit spontaneous infiltration. The transition metal borides are typically in a particulate form (1–30 microns). The barrier materials may be applied as a slurry or paste to the boundaries of the permeable mass of ceramic filler material which preferably is preshaped as a preform.

Other useful barriers for aluminum metal matrix alloys in nitrogen include low-volatility organic compounds applied as a film or layer onto the external surface of the filler material or preform. Upon firing in nitrogen, especially at the process conditions of this invention, the organic compound decomposes leaving a carbon soot film. The organic compound may be applied by conventional means such as painting, spraying, dipping, etc.

Moreover, finely ground particulate materials can function as a barrier so long as infiltration of the particulate material would occur at a rate which is slower than the rate of infiltration of the filler material.

Thus, the barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, spontaneous infiltration substantially terminates when the infiltrating matrix metal reaches the defined surface boundary and contacts the barrier means.

The following examples are presented in order to more completely illustrate the invention. It should be understood that the invention is not to be construed as being limited to these specific examples, but is to be construed broadly, and changes and modifications may be made to the examples herein without departing from the scope and spirit of the invention as defined in the appended claims.

EXAMPLE 1

This Example demonstrates the fabrication of a castable metal matrix composite material comprising by volume about 30 percent silicon carbide. In particular, this Example demonstrates a comminution step comprising high intensity shearing to break down and disperse oxide skins and other entrapped inclusions.

About 25.5 kilograms of a filler material mixture comprising by weight about 98% 500 grit (average particle diameter of about 16 microns), #9538 round "39 CRYSTOLON®" green silicon carbide particulate (Grade F500 RG, Norton Co., Worcester, Mass.) and about 2 percent "minus 325 mesh" (particle diameter less than about 45 microns) magnesium powder (Hart Metals, Rumson, N.J.) were blended for about 15 minutes, under an argon-oxygen gas mixture comprising about 2 volume percent oxygen and the balance argon in an approximately 1 cubic foot (28 liter) capacity V-blender. This procedure was repeated to produce a sufficient quantity of filler material mixture to be used to form billets.

Figure 2A:
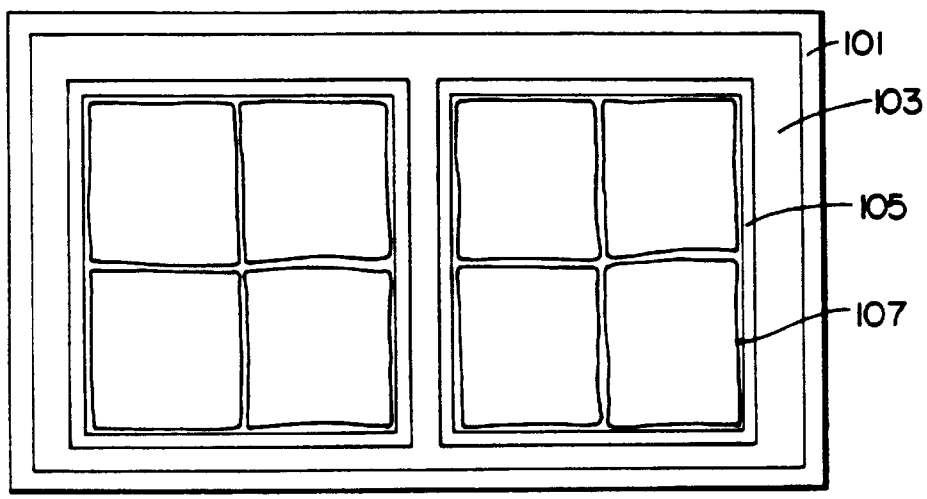
FIGS. 2A and 2B show top and side schematic views, respectively, of a lay-up utilize fabricating the highly loaded metal matrix composite body of Example 1.
Figure 2B:
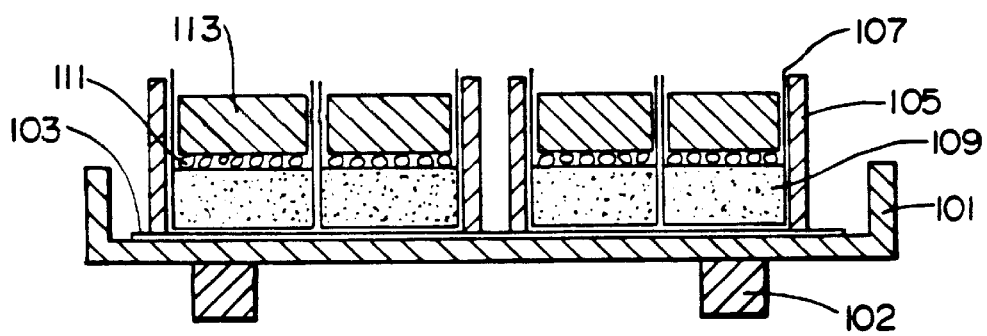

Referring to FIGS. 2A and 2B, graphite tray 101 measuring about 20.125 inches (511 mm) wide by about 40.75 inches (1035 mm) long and having side walls extending about 3 inches (76 mm) above the interior surface of the tray was placed on spacers 102 approximately 3 inches (76 mm) tall. A sheet of PERMA-FOIL® graphite foil 103 (TT America, Portland, Oreg.) measuring about 20 inches (508 mm) wide by about 40 inches (1016 mm) long by about 0.015 inch (0.38 mm) thick was placed onto the graphite tray. Two graphite frames 105, consisting essentially of a box open at both ends, and each measuring about 16.25 inches (413 mm) square by about 7.5 inches (191 mm) high were placed adjacent to one another on the graphite foil 103. Each of four PERMA-FOIL® graphite foil boxes 107 each measuring about 8 inches (203 mm) square by about 8 inches (203 mm) high were fabricated from a single sheet of foil by making strategically placed cuts and folds in the foil and stapling the overlapping folded regions to form the walls of the box. Four such fabricated boxes 107 were placed into each graphite frame 105.

About 6500 grams of the filler material mixture 109 were poured into a graphite foil box and levelled and lightly pressed but not packed or tamped. About 7.0 grams of "minus 50, plus 100" mesh (particle diameters between about 150 microns and 300 microns) magnesium powder 111 (Hart Metals, Rumson, N.J.) were sprinkled evenly over the top of the exposed surface of the leveled filler material mixture 109. An ingot of matrix metal 113 comprising by weight about 10 percent silicon and the balance aluminum, measuring about 7.75 inches (197 mm) square by about 2.5 inches (64 mm) thick and having a minimum weight of at least 6175 grams, was stacked on the leveled filler material mixture 109 to form a setup. The other seven graphite foil boxes were similarly provided with the filler material mixture, magnesium powder and ingots of matrix metal to form equivalent setups, thereby completing the lay-up.

The lay-up comprising the graphite tray and its contents were placed into a retort-lined resistance heated furnace. After the retort door was closed, the ambient atmosphere in the retort chamber was evacuated with a roughing pump. The chamber was then backfilled with commercially pure nitrogen gas. A flow rate of about 70 standard cubic feet per hour (1980 liters per hour) of nitrogen was established through the retort chamber. The pressure within the retort chamber was maintained at about one pound per square inch (6.895 kPa) above atmospheric pressure. The furnace and its contents were then heated from about 20° C. to about 550° C. at about 100° C. per hour; held at about 550° C. for about 5 hours; heated from about 550° C. to about 790° C. at about 200° C. per hour; held at about 790° C. for about 16 hours; and cooled from about 790° C. at about 200° C. per hour.

During the heating sequence and while the nitrogen flow rate was maintained, the matrix metal melted and spontaneously or pressurelessly infiltrated the filler material mixture to produce eight substantially identical billets comprising highly loaded metal matrix composite bodies integrally attached to excess matrix metal. Below a temperature of about 300° C., the lay-up optionally could be withdrawn from the furnace and allowed to continue cooling in air to about 20° C. Once the lay-up had cooled to about 20° C., the graphite frames 105 were lifted from around the infiltrated billets and as much of the graphite foil box material 107 as could be removed by hand was so removed. Any remaining attached remnants of graphite foil were removed from the billets of highly loaded metal matrix composite material by grit blasting and/or chiseling.

The above procedure was repeated to produce a stockpile of billets to be used as feedstock to produce metal matrix composite material suitable for casting (e.g., metal matrix composite material having a reduced filler loading).

Equipment for producing the reduced-filler-loading metal matrix composite material is depicted schematically in FIGS. 3, 4, 5A, 5B and 6.

Figure 3:
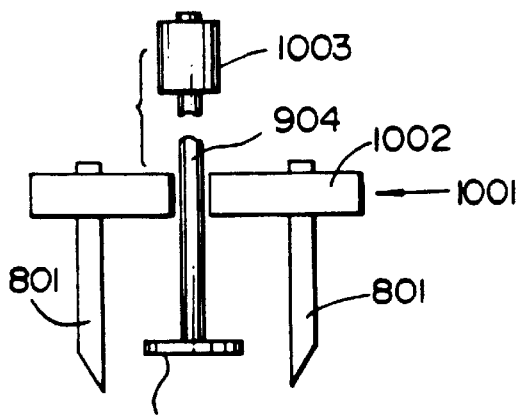
FIG. 3 is a side schematic view of an apparatus utilized for high energy she g or stirring a composite melt.

FIG. 3 depicts an apparatus 1001 comprising a furnace cover 1002 supporting baffles 801. Furnace cover 1002 was formed from 11 gauge 304 stainless steel. Furnace cover 1002 comprised halves each having an outer diameter of about 28 inches (712 mm) and an inner diameter of about 8 inches (264 mm). Each half of furnace cover 1002 incorporated two slots measuring about 3 inch (76 mm) long and about ¾ inch (19 mm) wide to accommodated baffles 801. The slots were located along a radius about 5.75 inches (146 mm) from the axis of rotational symmetry of furnace cover 1002. The slot spacing was set such that line segments parallel to the 3 inch (76 mm) sides of each slot were perpendicular. Each half of furnace cover 1002 had a thickness of about 1.25 inches (31.8 mm) which was formed by welding about 14 gauge 314 stainless steel strips along its inner and outer diameter. A cover for the hole in furnace cover 1002 was fabricated from a piece of 14 gauge 314 stainless steel measuring about 10 inches (254 mm) square with a slot measuring about 1 inch (25.4 mm) wide and extending from one side of the cover to the center of the cover. This cover aligned with the hole in furnace cover 1002 defined by its 8 inch (204) inner diameter while accommodating the rotating shafts which supported the rotating tools used at least during the dispersion step for forming lower loaded metal matrix composite bodies.

Figure 4:
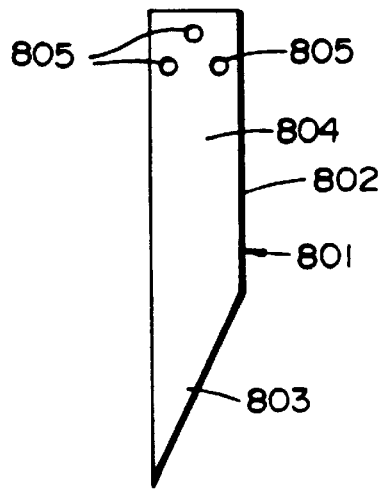
FIG. 4 shows the shape of one of the four baffles utilized during high energy shearing.

Baffles 801 incorporated in apparatus 1001 were machined from graphite to the configuration depicted in FIG. 4. Prior to incorporation, baffles 801 were subjected to a coating process described in commonly owned U.S. Pat. No. 5,242,710, issued Sep. 7, 1993, from U.S. patent application Ser. No. 07/880,479, in the names of Terry Dennis Claar et al. and entitled "Methods for Making Self-Supporting Composite Bodies and Articles Produced Thereby". The subject matter of U.S. Pat. No. 5,242,710 is hereby incorporated by reference in its entirety. The process described in U.S. Pat. No. 5,242,710 was used to produce a titanium carbide coating 802 on substantially all the surfaces of baffle 801. The graphite substrate comprised Grade AXF-5Q graphite (POCO Inc., Decatur, Tex.). To produce the baffle depicted in FIGS. 3 and 4, the graphite was machined about 22 inches (559 mm) long, about 2.75 inches (69.9 mm) wide and about ⅜ inch (9.5 mm) thick. The lower portion 803 of baffle 801 was formed by cutting a segment from the about 22 inches (551 mm) long side to an about 16 inches (406 mm) along opposite side of the graphite piece.

Three holes 805 were drilled at the top portion 804 of baffle 801. Each hole had a diameter of about ⅝ inch (15.9 mm).

A first hole 805 was spaced about ¾ inch (19 mm) from the top and about 1.38 inches (35 mm) from each side of baffle 801. A second and a third hole 805 were spaced about 1.75 inches (44.4 mm) from the top and about 0.63 inch (16 mm) from the side of baffle 801. The second and third holes were also spaced about 1.5 inches (38 mm) from each other.

Also depicted in FIG. 3 is rotating means 1003, shaft 904 and blade 905 or 701. Shaft 904 corresponds to the shaft used with blade 905 schematically depicted in FIGS. 5A and 5B. In the present Example, rotating means 1003 comprised an electric mixer (Model No. HVI-15, Hockmeyer Equipment Co., Elizabeth, N.C.).

In regard to shaft 904 and blade 905, a more detailed discussion follows. Shaft 904, which measured about 30 inches (762 mm) long and about ⅝ inch (16 mm) in diameter, was cut from 316 stainless steel. Blade 905 had an outermost diameter of about 5 inches (127 mm), for example, the distance between narrowest portion of segments 902D and 902B, and an intermediate diameter of about 3 inches (76 mm), for example, the distance from the axis of rotation of blade 905 to that portion of any of the 902 or 903 which is perpendicular to a diagonal running through the rotational axis. The material used to fabricate blade 905 was about ⅛ inch (3.2 mm) thick. As with shaft 904, blade 905 was fabricated from 316 stainless steel. Shaft 904 was welded to blade 905. Additional features of blade 905 included alternating segments 902 and 903. Segment 903A, 903B, 903C and 903D extend upward while segment 902A, 902B, 902C and 902D extended downward from the plane of blade 905. After blade 905 was welded to shaft 904, both were coated with an alumina material formed by a plasma deposition technique (PP-30 coating applied by Standard Engineering and Machine Co., Wilmington, Del.).

Figure 6:
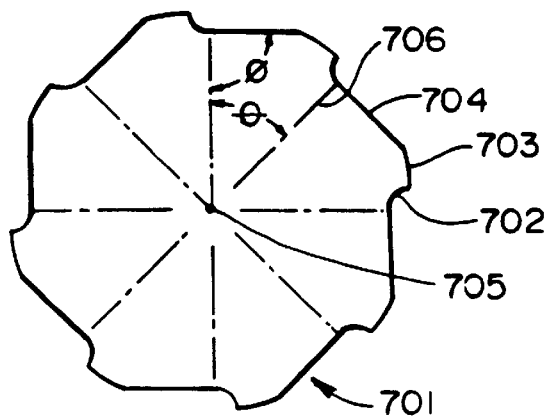
FIG. 6 is a top schematic view of an impeller utilized in the high intensity shearing of a composite melt.

Blade 701, depicted schematically in FIG. 6, was machined from commercially available graphite (e.g., Grade AXF-5Q graphite from POCO Graphite Inc., Decatur, Tex.). Blade 701 measured about 6 inches (152 mm) in diameter and about ¾ inch (19 mm) thick. Angles phi and theta marked in FIG. 6 measure about 90° and 45°, respectively. Extensions 703 were formed along blade 701 by machining an about 10/32 inch (7.9 mm) radius 702 every 45° along the outer diameter an about 6 inch (152 mm) diameter disc of graphite. During the machining of radius 702, flat 704 was formed. Flat 704 was substantially perpendicular to radial segment 706. After machining, blade 701 was secured to a ⅝ inch (15.9 mm) diameter rod measuring about 31 inches (787 mm) long and compositionally comprising 316 stainless steel.

A sufficient number of ingots of the dilution alloy material to prepare a cast metal matrix composite material comprising about 30 percent by volume of silicon carbide particulate were produced as follows: A 600 pound (272 kg) capacity crucible, having an inner diameter measuring about 21 inches (533 mm) and a height measuring about 27 inches (686 mm) made from a commercially available silicon carbide/graphite material and contained within an inductively heated furnace, was charged with about 181 pounds (82 kg) of a dilution alloy comprising by weight about 10 percent silicon and the balance aluminum. The dilution alloy had previously been prepared by alloying nominally pure silicon metal with nominally pure aluminum metal, degassing the molten alloy and casting the molten alloy into cast iron pig molds to produce billets of the dilution alloy having a trapezoidal cross-section, measuring about 24 inches (610 mm) in length and weighing about 20 pounds (9 kg) each. The rest of the crucible was charged with as much of the required 419 pounds (190 kg) of the highly loaded metal matrix composite material as would conveniently but loosely fit into the crucible. The remainder of the 419 pounds (190 kg) of the metal matrix composite billets which would not fit into the crucible at this point was placed into an air atmosphere furnace and preheated to a temperature of about 450° C. in preparation for subsequent addition to the crucible once sufficient space became available. Nitrogen gas flowing at a rate of about 60 standard cubic feet per hour (scfh) (28 standard liters per minute (slpm)) was directed into the crucible to serve as a cover gas. The crucible and its contents were then heated from about 20° C. to a temperature of about 650° C.

Figure 5A:
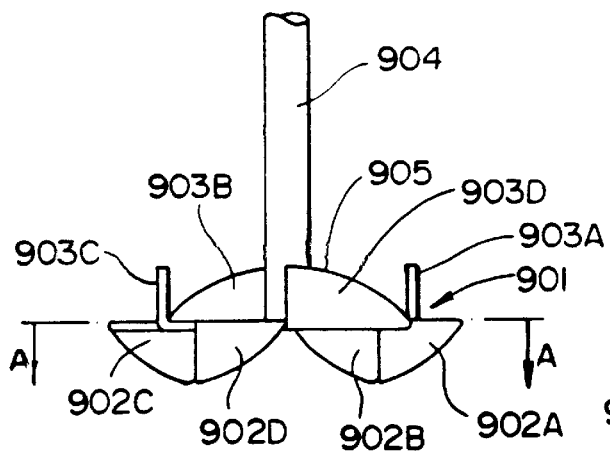
FIGS. 5A and 5B illustrates side and top schematic views, respectively, of a impeller utilized in dispersing the filler material throughout the molten matrix metal of a composite melt.
Figure 5B:
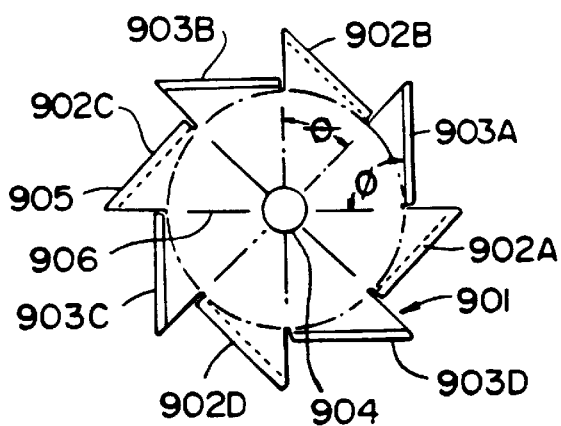

When the temperature of the contents of the crucible had stabilized at about 650° C., the alumina coated impeller corresponding to FIGS. 5A and 5B was attached to rotational means 1003 (Model No. HVI-15 mixer, Hockmeyer Equipment Co.) and lowered so that blade 905 was within about 1 inch (25 mm) of the melt surface. After preheating the impeller for about 5 minutes in this position, the impeller was lowered into the melt such that blade 905 was positioned between about 7 inches (178 mm) and about 12.5 inches (318 mm) from the bottom of the crucible. The rotational means 1003 was then energized to accelerate the impeller up to a rotational speed of about 500 to about 700 revolutions per minute (rpm). After mixing in this manner for about 5 minutes, mixing was ceased and the impeller was raised out of the composite melt and positioned out of the way.

The dross was skimmed off of the surface of the composite melt using a commercially available skimmer which had previously been coated with a commercially available "ZIRCWASH™ " mold wash (ZYP Coatings, Oak Ridge, Tenn.) and appropriately dried and conditioned by dipping into unreinforced molten aluminum prior to contact with the composite melt. The preheated metal matrix composite billets making up the balance of the 419 pounds (190 kg) of the highly loaded metal matrix composite material were then charged into the composite melt in the crucible. The furnace was thermostatically set to stabilize at a temperature of about 600° C.

After a period of about 45 minutes, the temperature of the composite melt had come back up to about 600° C. and had stabilized at this temperature. The blade of the impeller was then repositioned to within about 1 inch (25 mm) of the surface of the composite melt and allowed to preheat in this position for about 5 minutes. The impeller was then slowly lowered into the melt and mixing commenced as described previously for about 5 minutes, after which time, the impeller was raised out of the composite melt. Four preheated graphite baffles 804 were secured to furnace cover 1002. The impeller and baffles were then slowly lowered into the composite melt so as to prevent gas entrapment.

The flow of nitrogen gas was shut off and in its place, argon gas was directed over the surface of the composite melt. Specifically, liquid argon was introduced into a circular stainless steel tube containing about 15 small exit holes regularly spaced around the circumference, which was located on a ledge above the melt inside the furnace. The flow rate of argon was adjusted such that the oxygen content above the surface of the composite melt was maintained below a level of about 1 percent as measured by an oxygen probe. The rotational means was energized and the impeller was accelerated up to a speed of about 1000 to about 1200 rpm.

After mixing using blade 905 for about 50 minutes, mixing was ceased and the impeller with its attached blade 905 was lifted out of the composite melt and positioned out of the way. Another impeller comprising blade 701 was then attached to the rotational means and positioned over the composite melt such that blade 701 was about 1 inch (25 mm) above the surface of the melt. After maintaining this position for about 5 minutes to preheat the impeller, the impeller was lowered into the composite melt to a distance between about 7 and 12.5 inches (178 and 318 mm) above the bottom of the crucible. The controller for the furnace temperature was adjusted such that the crucible and its contents were heated to a temperature between about 685 and 700° C. The rotational means was then energized and high speed shearing of the composite melt was commenced at an impeller speed between about 1400 and about 1700 rpm. After mixing at this speed for about 60 minutes, the temperature of the composite melt was noted. If temperature adjustment was required, mixing was continued until the temperature of the composite melt came back into the range of about 685 to about 700° C. With the temperature of the composite melt within this range, mixing was ceased and the impeller, furnace cover and the attached baffles were raised such that the impeller blade was completely lifted out of the composite melt and the furnace cover, baffles and impeller were positioned out of the way.

The composite melt was once again skimmed to remove any dross that might have formed since the last skimming operation. With the furnace cover removed, the liquid argon flow was readjusted (i.e., increased) so as to maintain the oxygen level above the melt surface at a concentration of about 1 volume percent or less. The melt was then manually transferred and carefully poured into cast iron ingot molds using a single pour per mold to form pigs of a cast metal matrix composite material comprising by volume about 30 percent filler material comprising silicon carbide.

EXAMPLE 2

This Example demonstrates the application of the claimed invention to a castable metal matrix composite comprising about 1 weight percent iron. This Example was carried out in substantially the same manner as was Example 1 except that the composition of the matrix metal of the cast material was modified as follows:

A diluted aluminum-iron master alloy comprising by weight about 10 percent iron and the balance aluminum and silicon were prepared by melting about 40 parts of an aluminum-iron master alloy comprising by weight about 25 percent iron, balance aluminum, with about 60 parts of a matrix alloy comprising by weight about 10 percent silicon and the balance aluminum. The resulting diluted aluminum-iron master alloy was degassed substantially as described for the Al-10Si alloy of Example 1 and cast into graphite molds to form billets measuring about 12 inches (305 mm) long by about 6 inches (152 mm) wide by about 0.5 inch (13 mm) thick.

The crucible used to melt and dilute the highly loaded metal matrix composite was charged with all of the ingots of the diluted aluminum-iron master alloy and the Al-10Si matrix alloy required to reduce the filler loading in the cast metal matrix composite material to about 30 volume percent and to increase the iron content in the matrix metal of the cast metal matrix composite to about 1 weight percent. The remaining space in the crucible was charged with billets of the highly loaded metal matrix composite material. As described in Example 1, those highly loaded billets which would not fit into the crucible prior to melting of the contents of the crucible were preheated to about 450° C. in a separate furnace in preparation for addition to the crucible once the contents of the crucible had melted.

From this point onwards, the processing of the castable metal matrix composite material was substantially identical to the processing described at the equivalent location in Example 1.

EXAMPLE 3

This Example demonstrates that cast metal matrix composite materials may be recycled; that is, metal matrix composite materials which were previously cast may be remelted and recast. Specifically, this Example demonstrates the use of an impeller operated at a relatively high shear rate to comminute inclusions and other defects picked up during the previous casting process, thereby rendering such inclusions, particularly entrained oxide skins, innocuous.

Figure 7:
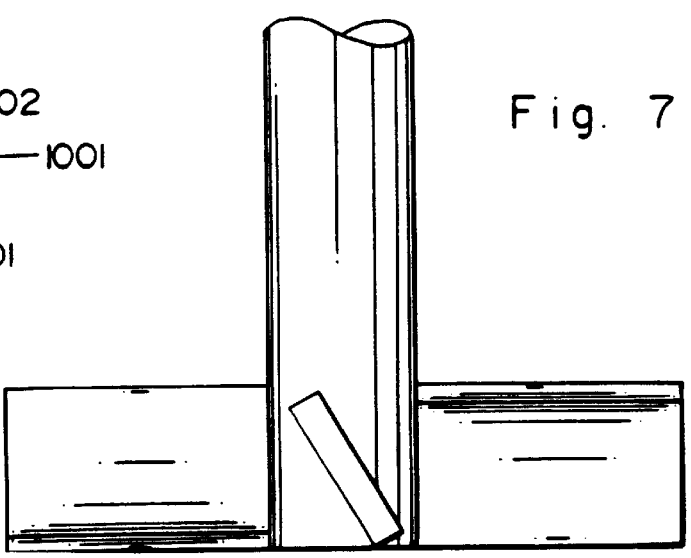
FIG. 7 is a cross-sectional schematic view of the impeller utilized in dispersing filler material throughout the molten matrix metal of a composite melt as described in Example 3.

About 600 pounds (272 kg) of scrap metal matrix composite material pieces were placed into the silicon carbide crucible described in Example 1 and heated to a temperature of about 700° C. The scrap pieces of metal matrix composite material comprised by volume about 30 percent 500 grit (average particular size of about 16 microns) #9538 round 39 CRYSTOLON® green silicon carbide particulate (Grade F500 RG, Norton Co., Worchester, Mass.) with the balance comprising matrix metal comprising by weight about 10 percent silicon and the balance aluminum. The scrap pieces were each taken from various sand castings downstream of a 10 or 20 pores per inch (4 or 8 pores per cm) ceramic filter. After the scrap metal matrix composite cast materials had melted to form a composite melt and had sat undisturbed in this molten condition for up to 16 hours, the contents of the melt were stirred so as to produce as homogeneous a mixture as possible for casting. Specifically, a graphite impeller such as shown in the side view of FIG. 7, comprising 4 blades each measuring about 3 inches (76 mm) long by about 1 inch (25 mm) wide and about ³⁄₁₆th inch (5 mm) thick was attached to the drive unit of the Model No. HVI-15 Hockmeyer Mixer (Hockmeyer Equipment Co., Elizabeth City, N.C.) and preheated for about 5 minutes at a position about 1 inch (25 mm) above the surface of the composite melt. After preheating, the impeller was lowered into the composite melt to a depth of between 7 inches (178 mm) and about 12.5 inches (318 mm) from the bottom of the crucible. The composite melt was at a temperature of about 710° C. The drive unit was energized and the impeller was accelerated up to a speed of about 250 rpm. After mixing the composite melt at a speed of about 250 rpm for about 15 minutes, stirring was ceased and the impeller was raised out of the composite melt and positioned out of the way. The surface of the composite melt was skimmed using the coated and dried skimming tools described in Example 1 and about 20 pounds (9 kg) of the composite melt was carefully hand ladled into a cast iron pig ingot mold to form a cast metal matrix composite ingot.

The remainder of the composite melt was then subjected to a high intensity shearing operation.

Figure 10A:
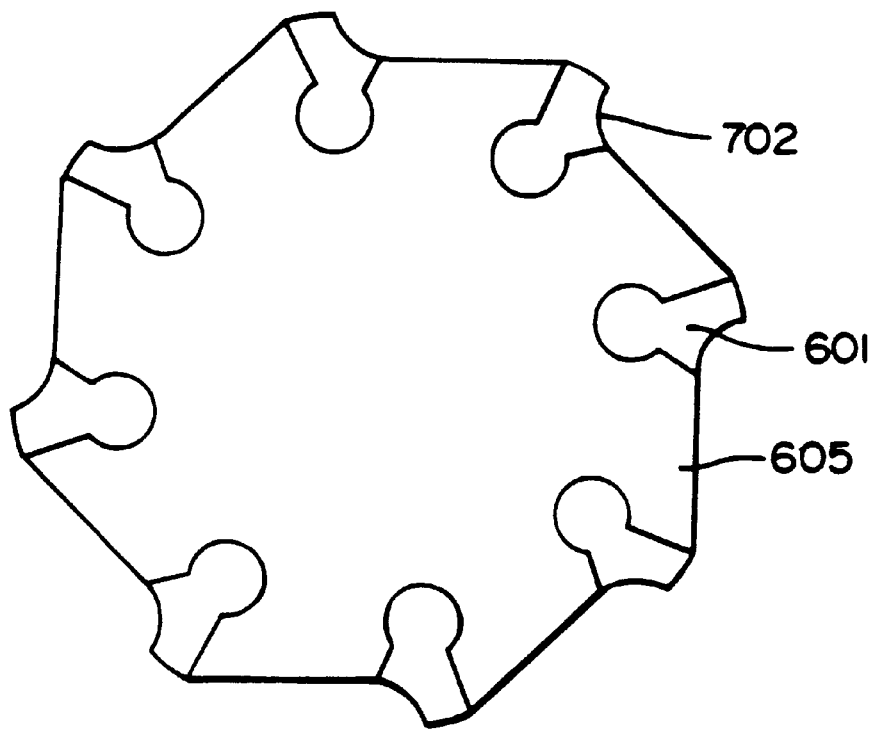
FIGS. 10A and 10B are bottom and side schematic views, respectively, of an improved impeller design for the high intensity shearing of an aluminum metal matrix composite melt.
Figure 10B:
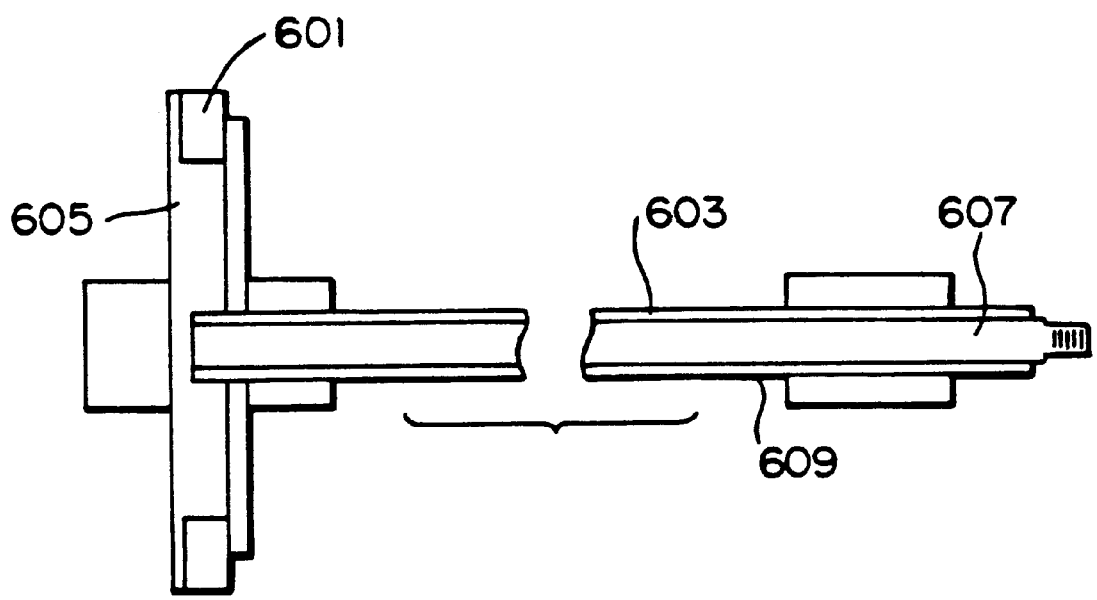

The composite melt was then recharged with two metal matrix composite ingots cast from virgin material having substantially the same size, shape and composition of the two ingots which were cast as described immediately above. The two added cast metal matrix composite ingots were first preheated to a temperature of about 450° C. in air prior to their introduction into the composite melt within the silicon carbide crucible. After about 10 minutes in the composite melt, the added cast metal matrix composite ingots had substantially completely melted and the composite melt had substantially recovered its former temperature of about 700° C. An impeller similar to that depicted in FIGS. 10A and 10B was attached to the Model No. HVI-15 Hockmeyer Mixer and preheated at a distance of about 1 inch (25 mm) above the surface of the composite melt for about 5 minutes. Unlike the impeller of FIG. 6, the impeller utilized for high-speed shearing as described in this Example measured about 4.75 inches (121 mm) in diameter and featured titanium carbide inserts at surfaces 702. The impeller utilized in the present Example furthermore featured a graphite sleeve 603, extending from the graphite impeller 605 to a distance of about 23 inches (584 mm) up the approximately 30 inch (262 mm) long stainless steel shaft 607. The graphite shaft sleeve was coated with titanium carbide 609 in substantially the same manner as was described for the graphite baffles of Example 1. The fit of the graphite shaft sleeve to the stainless steel shaft was such than the composite melt was prevented from contacting the stainless steel shaft at all times.

Liquid argon was introduced into the crucible above the composite melt by substantially the same procedure as was described in Example 1. The titanium carbide coated graphite baffles described in Example 1 were installed in their slots in the furnace cover which was then placed into position over the crucible so that the baffles extended into the composite melt. The impeller was then lowered into the composite melt to the previously mentioned height above the bottom of the crucible. The drive unit of the Hockmeyer mixer was then energized and the impeller was accelerated up to a speed of about 1800 rpm. The liquid argon flow rate was adjusted to maintain an oxygen concentration above the surface of the composite melt at or below about 1 volume percent. This oxygen level and the temperature of the composite melt were monitored about once every 10 minutes.

After shearing the composite melt in this manner for about 1 hour, the mixer drive unit was de-energized and shearing was ceased. The impeller was raised out of the composite melt, moved out of the way of the silicon carbide crucible and scraped of residual composite melt. The baffles were likewise raised out of their slots in the furnace cover and similarly scraped. The two halves comprising the furnace cover were removed and with the liquid argon still flowing, the dross was scraped from the surface of the composite melt using the coated and dried skimming tools described in Example 1. Approximately 20 pound (9 kg) ingots of the composite material were cast into approximately 20° C. cast iron ingot molds to form pig ingots of cast metal matrix composite material comprising about 30 volume percent of silicon carbide particulate. Twenty-seven other such metal matrix composite ingots were similarly cast and numbered in sequential order.

Figure 8A:
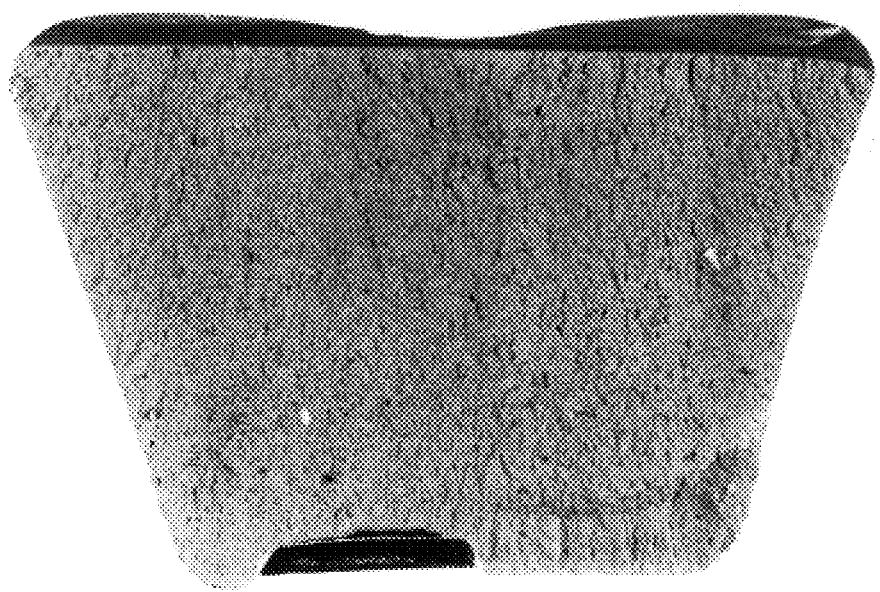
FIGS. 8A–8D are photographs of fractured cross-sections of metal matrix composite ingots cast according to the methods of Example 3.
Figure 8B:
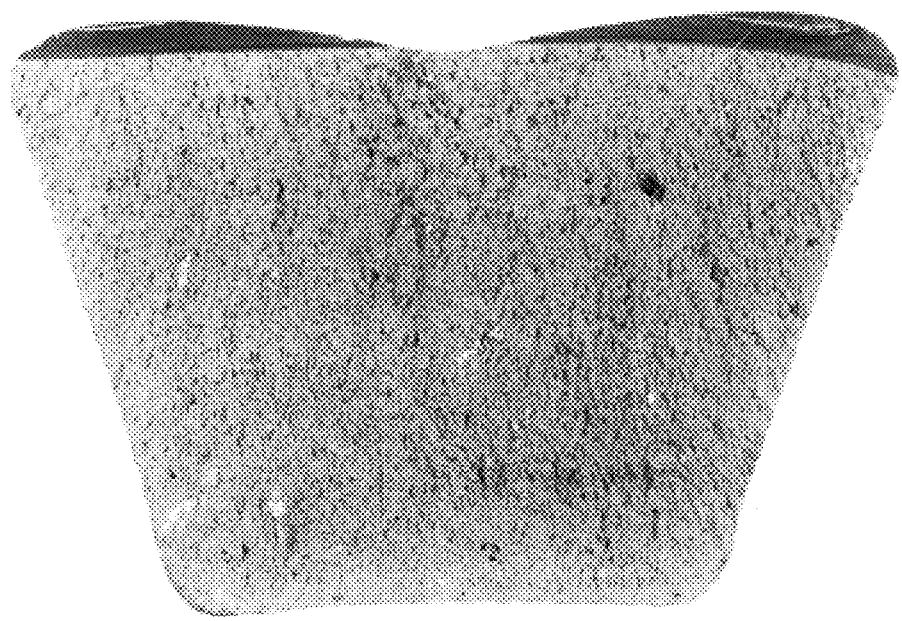
Figure 8C:
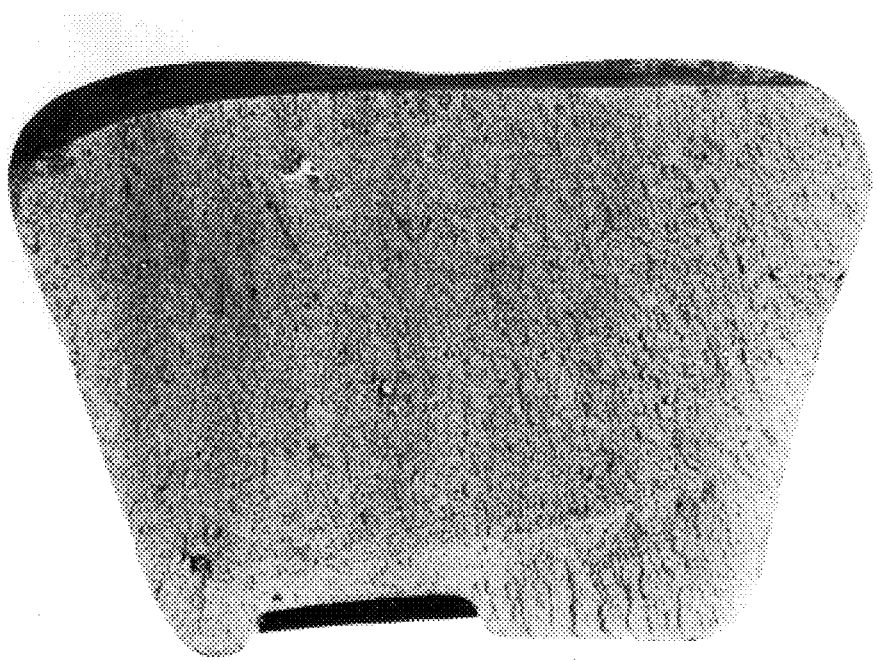
Figure 8D:
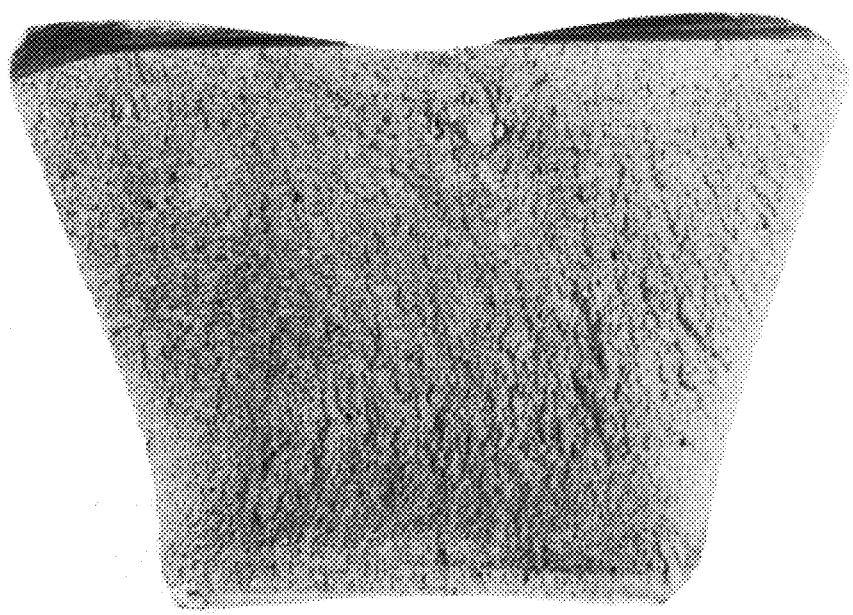

Cast metal matrix composite ingot numbers 4 and 12 were isolated for fracture analysis along with the two cast metal matrix composite ingots whose composite melts were not subject to high intensity shearing. To fracture each ingot, a low angled chevron was machined into the top surface of each ingot at the desired cross-section using a saw embedded with diamond particulate. The ingot was then fractured at this location by means of blows administered with a sledge hammer. Macroscopic photographs of four such fractured surfaces are shown in FIGS. 8A through 8D. Specifically, FIGS. 8A and 8B are fractured surfaces of the ingots which were cast without high energy shearing and FIGS. 8C and 8D show fracture surfaces of those cast ingots whose processing had employed such high shearing. Although the fracture surfaces generally show overall good quality of the composite melt, the fracture surfaces of FIGS. 8C and 8D show somewhat fewer and smaller inclusions, thereby suggesting the benefits of high intensity shearing.

Therefore, this Example demonstrates that high intensity shearing of a composite melt contributes to reducing the size of entrained or entrapped inclusions such as oxide skins which might otherwise be deleteriously introduced into the composite melt through the recycling of scrap metal matrix composite pieces. The reduction in size of such inclusions thus helps to maintain the quality of such castings through repeated casting-melting-recasting cycles.

EXAMPLE 4 matrix composite body. This Example furthermore demonstrates the desirability and advantage of high power shearing for reconditioning a previous cast composite melt in preparation for recasting.

About 48 pounds (22 kg) of scrap cast metal matrix composite material having a substantially uniform composition of about 30 volume percent of 500 grit (average particle size of about 16 microns) #9538, round 39 CRYSTOLON® green silicon carbide particulate (Grade F500 RG, Norton Co., Worchester, Mass.) in a matrix comprising by weight about 10 percent silicon and the balance aluminum, and derived from a common source, e.g., a filtered sand casting, was sand blasted to remove the majority of removable defects attached to the surface of each of the scrap pieces. The scrap cast metal matrix composite material was then baked at a temperature of about 350° C. in air for about 1.5 hours for the purpose of removing any volatile materials contacting the surface of each piece. The scrap metal matrix composite material was then charged into a commercially available silicon carbide/graphite crucible contained with a resistance heated air atmosphere furnace. However, the contents of the crucible during heating and melting were maintained under an argon gas cover provided by an argon gas flow rate of about 7 standard liters per minute. The composite melt reached a maximum temperature of about 765° C. during heating and melting, but was at a temperature of about 700° C. at the time of casting. The composite melt was hand stirred, skimmed of dross and hand ladled into approximately 20° C. cast iron pig molds to produce approximately 20 pound ingots (9 kg) of cast metal matrix composite material comprising about 30 volume percent silicon carbide particulate.

Figure 9A:
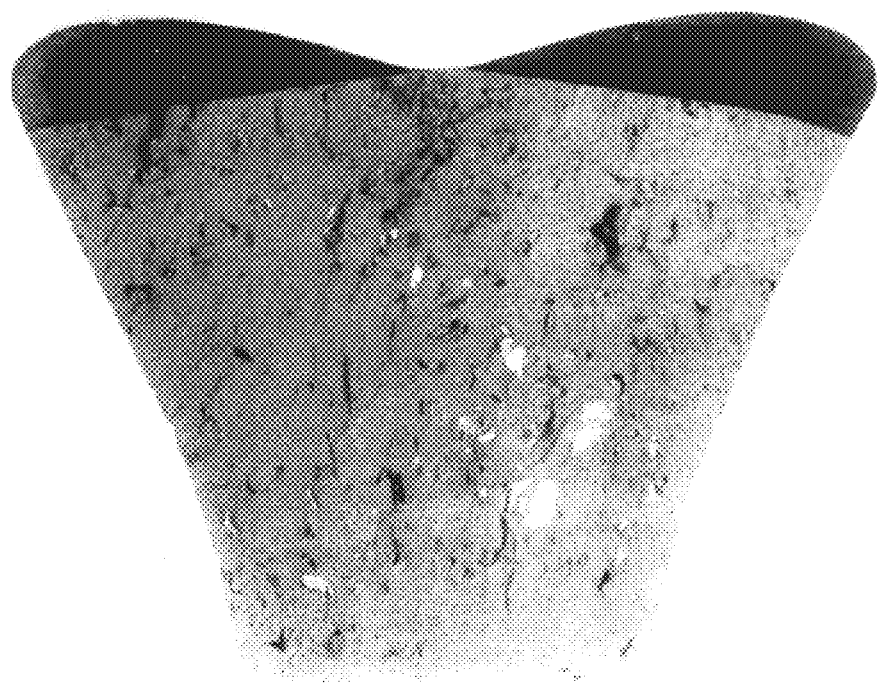
FIGS. 9A and 9B are photographs of fractured cross-sections of metal matrix composite ingots cast according to the methods of Example 4.

After the composite casting had solidified and cooled to substantial room temperature, the ingot was fractured in substantially the same manner as was described in Example 3. FIG. 9A shows a cross-section of the cast metal matrix composite ingot at the fractured surface. The Figure reveals several types of large defects including oxide inclusions, which most likely derived from the oxide skin of the previous castings.

Figure 9B:

The above-described process was substantially repeated on a similar composite melt with the exception that the processing further included a high intensity shearing operation of the composite melt. Specifically, once the scrap cast metal matrix composite material had melted to produce a composite melt, a cover gas comprising nitrogen was provided to the surface of the composite melt by flowing commercially pure nitrogen gas at a rate of about 2.5 standard liters per minute into the crucible. A graphite impeller attached to a stainless steel shaft and having substantially the same shape as that shown in FIG. 6 was attached to rotational means 1003 comprising an air-driven motor (see FIG. 3). Unlike the impeller of similar shape described in Example 1, the present impeller had a diameter of about 2.5 inches (64 mm). The graphite impeller was accelerated up to a rotational speed of about 2000 rpm and shearing of the composite melt was carried out for a duration of about 30 minutes. After shearing for about 30 minutes, the motor was turned off, the impeller stopped and the impeller was removed from the composite melt. Pig ingots of the composite melt were cast as before, solidified, cooled and fractured. FIG. 9B is a macroscopic photograph of a cross-section of the fracture surface. Comparison of FIG. 9B with FIG. 9A reveals that the apparent effect of the shearing process was to comminute inclusions, particularly the larger inclusions. In particular, the oxide inclusions of FIG. 9B appear to have been substantially reduced in size compared to their counterparts in FIG. 9A.

Thus, this Example demonstrates a method of recycling a previously cast metal matrix composite material comprising a high intensity shearing process of the composite melt. Specifically, this Example demonstrates that a high shear process performed on the composite melt acts to comminute entrained inclusions, particularly large inclusions which can severely adversely affect the fluidity of the composite melt as well as the mechanical properties of the solidified castings, thereby rendering such inclusions smaller in size and therefore less damaging to the quality of the composite castings so produced.

What is claimed is:

1. A method for making a cast metal matrix composite, comprising:
    charging a crucible with at least one metal matrix composite body comprising at least one filler material embedded by a matrix metal;
    melting said matrix metal to form a composite melt comprising a sufficient number and size of impurity inclusions as to significantly degrade at least one set of properties selected from the group consisting of casting properties of said composite melt and mechanical properties of a metal matrix composite body cast from said melt;
    introducing into said composite melt a means for comminuting said impurity inclusions;
    comminuting said impurity inclusions sufficiently so as to noticeably restore at least one of said degraded properties;
    dispersing said comminuted impurity inclusions throughout said composite melt; and
    casting said composite melt.

2. The method of claim 1, wherein said dispersion is accomplished by means of a rotatable impeller.

3. The method of claim 1, wherein said comminuting and said dispersing are accomplished by means of a single rotatable impeller.

4. The method of claim 1, further comprising providing a substantially inert cover gas over a surface of said composite melt.

5. The method of claim 1, further comprising skimming a surface of said composite melt prior to casting said composite melt.

6. The method of claim 1, wherein said metal matrix composite body is charged to a crucible already containing a composite melt.

7. The method of claim 1, wherein said comminuting is performed to an extent sufficient to reduce said impurity inclusions to a size comparable to the size of said filler material.

8. The method of claim 1, wherein said comminuting comprises high intensity shearing.

9. The method of claim 1, wherein said means for comminuting comprises a rotatable impeller.

10. The method of claim 9, wherein said rotatable impeller is rotated at high speed.

11. The method of claim 10, wherein said high speed comprises an impeller tip speed of at least about 10 meters per second.

12. The method of claim 9, wherein said comminuting is accomplished without substantial disturbance of a surface of said composite melt contacting at least a local atmosphere.

13. The method of claim 12, further comprising providing at least one baffle in contact with said composite melt.

14. The method of claim 6, wherein said comminuting is accomplished at a speed below that speed at which said disturbance of said composite melt surface begins to occur.

15. A method for recycling a metal matrix composite, comprising:

charging a crucible with at least one metal matrix composite body comprising at least one filler material embedded by a matrix metal;

melting said matrix metal to form a composite melt comprising a sufficient number and size of impurity inclusions as to significantly degrade at least one set of properties selected from the group consisting of casting properties of said composite melt and mechanical properties of a metal matrix composite body cast from said melt;

introducing into said composite melt a means for comminuting said impurity inclusions;

comminuting said impurity inclusions sufficiently so as to noticeably restore at least one of said degraded properties; and dispersing said comminuted impurity inclusions throughout said composite melt.

16. The method of claim 15, wherein said metal matrix composite body comprises scrap.

17. The method of claim 15, wherein said metal matrix composite body comprises virgin metal matrix composite material.

18. The method of claim 15, wherein said metal matrix composite body is charged to a crucible already containing at least one metal matrix composite body.

19. The method of claim 15, wherein said charging further comprises at least one body of matrix metal.

20. A method for reconditioning a composite melt, comprising:

providing a composite melt comprising a plurality of bodies of at least one substantially non-reactive filler material and at least one solid impurity inclusion embedded by a molten matrix metal, wherein the presence of said at least one solid impurity inclusion significantly degrades at least one property selected from the group consisting of casting properties of said composite melt and mechanical properties of a metal matrix composite body cast from said melt;

introducing into said composite melt a means for comminuting said at least one solid impurity inclusion;

comminuting said at least one solid impurity inclusion sufficiently so as to restore a substantial portion of at least one of said degraded properties; and withdrawing said comminuting means from said composite melt.

* * * * *